(12) United States Patent
Toyama et al.

(10) Patent No.: US 9,703,008 B2
(45) Date of Patent: Jul. 11, 2017

(54) OPTICAL FILM, POLARIZING PLATE, AND LIQUID CRYSTAL DISPLAY DEVICE

(71) Applicant: FUJIFILM Corporation, Tokyo (JP)

(72) Inventors: Hirofumi Toyama, Kanagawa (JP); Yoshinori Maeda, Kanagawa (JP); Isao Fujiwara, Kanagawa (JP); Ryuji Saneto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 48 days.

(21) Appl. No.: 14/734,528

(22) Filed: Jun. 9, 2015

(65) Prior Publication Data

US 2015/0355491 A1 Dec. 10, 2015

(30) Foreign Application Priority Data

Jun. 10, 2014 (JP) .................................. 2014-119625
Jun. 3, 2015 (JP) .................................. 2015-113159

(51) Int. Cl.
  *C09K 19/00* (2006.01)
  *G02B 1/04* (2006.01)
  (Continued)

(52) U.S. Cl.
  CPC ............ *G02B 1/04* (2013.01); *B29D 11/0073* (2013.01); *G02B 5/3083* (2013.01);
  (Continued)

(58) Field of Classification Search
  CPC . G02F 1/13363; G02F 1/133528; G02B 5/32; G02B 5/3033; G02B 5/3083;
  (Continued)

(56) References Cited

U.S. PATENT DOCUMENTS 8,792,071 B2 7/2014 Toyama et al.
2010/0020273 A1 1/2010 Toyama et al.
(Continued)

FOREIGN PATENT DOCUMENTS

JP 2010-026424 A 2/2010
JP 2010-215879 A 9/2010
(Continued)

OTHER PUBLICATIONS

Notification of Reasons for Refusal, issued by the Japanese Patent Office on Apr. 25, 2017, in connection with Japanese Patent Application No. 2015-113159.

*Primary Examiner* — Ruiyun Zhang
(74) *Attorney, Agent, or Firm* — Edwards Neils LLC; Jean C. Edwards, Esq.

(57) ABSTRACT

A thin optical film with high hygrothermal durability and high front contrast, includes cellulose acylate whose degree of substitution of acyl group is from 2.0 to 2.6 and at least one optical performance developer, wherein the cellulose acylate has a mannose content of 0.2% by mass or less, and the optical film has a thickness of 40 μm or thinner and satisfies:

$M_A \geq M_B \times 1.1$      Formula I $C_A \geq C_B \times 1.1$      Formula II wherein, A denotes the depthwise region ranging from one surface up to 2 μm depth of the optical film, and B denotes the depthwise region ranging from the other surface up to 2 μm depth, and $M_A$ and $M_B$ represent the mannose content in regions A and B; $C_A$ and $C_B$ represent the content of the optical performance developer in regions A and B; and $M_A$, $M_B$, $C_A$ and $C_B$ are given in % by mass.

16 Claims, 2 Drawing Sheets

(51) Int. Cl.
  *G02B 5/30*   (2006.01)
  *B29D 11/00*  (2006.01)
  *G02F 1/13363*  (2006.01)

(52) U.S. Cl.
  CPC . *G02F 2001/133635* (2013.01); *Y10T 428/10* (2015.01); *Y10T 428/1036* (2015.01)

(58) Field of Classification Search
  CPC .. G02B 5/3025; G02B 1/04; C08L 1/08–1/16; B29B 2001/08; B29B 2001/12; B29B 2001/14; Y10T 428/10; Y10T 428/1036; Y10T 428/1041; Y10T 428/105; B32B 23/08; B29K 2995/0034
  USPC .......... 428/1.1, 1.3, 1.31, 1.33; 349/96, 117, 349/118, 158; 359/489.07
  See application file for complete search history.

(56) References Cited

U.S. PATENT DOCUMENTS

| | | |
|---|---|---|
| 2010/0239786 A1 | 9/2010 | Takeda et al. |
| 2012/0249933 A1 | 10/2012 | Toyama et al. |

FOREIGN PATENT DOCUMENTS

| | | |
|---|---|---|
| JP | 2010-250298 A | 11/2010 |
| JP | 2013-067680 A | 4/2013 |
| JP | 2013-139541 A | 7/2013 |
| JP | 2013-195504 A | 9/2013 |
| JP | 2014-071203 A | 4/2014 |

OPTICAL FILM, POLARIZING PLATE, AND LIQUID CRYSTAL DISPLAY DEVICE

CROSS-REFERENCE TO RELATED APPLICATIONS

The present application claims priority under 35 U.S.C. §119 to Japanese Patent Application No. 2014-119625 filed Jun. 10, 2014 and Japanese Patent Application No. 2015-113159 filed Jun. 3, 2015. Each of the above applications are hereby expressly incorporated by reference, in its entirety, into the present application.

TECHNICAL FIELD

This invention relates to an optical film, a polarizing plate, and a liquid crystal display device.

BACKGROUND ART

Liquid crystal display device characterized by its less power consumption and space-saving feature has been expanding its applications year by year. Patent Literature 1 describes an optical film used in the liquid crystal display device, the film having a degree of substitution by acetyl group of 2.0 to 2.6, having both ratios of content of xylose and mannose relative to acetyl cellulose of 0.9% by mass or below, and containing a triazine-base retardation enhancer, a monosaccharide or disaccharide compound, and wavelength dispersion modifier. Patent Literature 2 describes a film containing a cellulose acylate with a total degree of substitution of 1.5 to 2.6 and a sugar ester, being thin, having optical performance developability, and showing a low level of internal haze.

Patent Literature 3 describes a cellulose film showing a dimensional change rate of −0.5% to +0.5% after allowed to stand in a 60° C./90% relative humidity atmosphere for 24 hours, and the film also reduces changes in black luminance in oblique view after allowed to stand at 60° C./90% relative humidity for 500 hours. Patent Literature 4 describes a polymer film having the front and back surfaces differed in wavelength dependence of refractive index anisotropy and/or refractive index anisotropy.

CITATION LIST

Patent Literature

[Patent Literature 1] JP-A-2013-195504
[Patent Literature 2] JP-A-2013-139541
[Patent Literature 3] JP-A-2010-250298
[Patent Literature 4] JP-A-2010-26424

SUMMARY OF THE INVENTION

Technical Problem

With recent advancement in the display quality as a result of enhanced definition of the liquid crystal display device, there have been demands on improving front contrast more than ever, and on thinning of the liquid crystal display device. Thinning of the liquid crystal display device requires thinning of glass plates used for the liquid crystal display device, so that the liquid crystal display device becomes more likely to warp due to dimensional changes in the constitutive members such as optical film under varied temperature and humidity. Also with increase in the volume of transaction in the form of open-cell product, which is a half-finished product before assembled with a back light for illuminating the screen from the back, there has been an increasing opportunity of transporting liquid crystal cells, and this has promoted stronger than ever the demand of improving unevenness in display caused by warping as described above.

While Patent Literature 1 discloses that unevenness ascribable to misaligned axis, possibly occurs in the process of stretching, might be improved, the film of Patent Literature 1 could not reduce the depolarized scattering (Hv) value, and consequently resulted in poor front contrast when the film was practically incorporated into the liquid crystal panel. While the film of Patent Literature 2 can enhance the front contrast by virtue of its small Hv value, there has been a demand for further reducing the Hv value.

On the other hand, it has becoming clear for a thin film, such as the film showing a dimensional change rate of −0.5% to +0.5% as described in Patent Literature 3, that unevenness when observed in the front direction became worse after conditioned under moisture and heat. The film of Patent Literature 4 has been discussed only on the ratio of front contrast and contrast at an oblique angle, but has not been mentioned on the front contrast per se.

This invention was conceived to solve the above-described problems, and is to provide an optical film, which is thin and capable of showing high hygrothermal durability and high front contrast, and a polarizing plate and a liquid crystal display which comprise the optical film.

Solution to Problem

After intensive studies aimed at solving the above-described problems, the present inventors found out that the Hv value of the optical film may successfully be reduced by assimilating patterns of the thicknesswise distribution of mannose and the thicknesswise distribution of an optical performance developer, and by reducing the mannose content in cellulose acylate, and that a liquid crystal display device showing high front contrast may be provided as a consequence. The findings led us to propose this invention.

This invention is specifically configured as follows:

<1> An optical film which comprises cellulose acylate whose degree of substitution of acyl group is from 2.0 to 2.6 and at least one optical performance developer, wherein the cellulose acylate has a mannose content of 0.2% by mass or less, and the optical film has a thickness of 40 μm or thinner and satisfies Formula I and Formula II below:

$$M_A \geq M_B \times 1.1 \qquad \text{Formula I}$$

$$C_A \geq C_B \times 1.1 \qquad \text{Formula II}$$

in the formulae, A denotes the depthwise region ranging from one surface up to 2 μm depth of the optical film, and B denotes the depthwise region ranging from the other surface up to 2 μm depth of the optical film, and $M_A$ represents the mannose content in the region A, $M_B$ represents the mannose content in the region B; $C_A$ represents the content of the optical performance developer in the region A, and $C_B$ represents the content of optical performance developer in the region B; and $M_A$, $M_B$, $C_A$ and $C_B$ are given in % by mass.

<2> The optical film of <1>, which further satisfies Formula III below:

$$Hv_{15}(0°,90°) \leq 10 \times 10^{-3} \qquad \text{Formula III}$$

in the formula, $Hv_{15}(0°,90°) = (Hv_{15}(0°) + Hv_{15}(90°))/2$, wherein $Hv_{15}(0°)$ and $Hv_{15}(90°)$ are measured with an arrangement of "polarizing plate/optical film/polarizing plate" with the absorption axes orthogonally arranged, and azimuth angle of 0° is defined in the direction of slow axis of the optical film, and $Hv_{15}(0°)$ represents luminance of light transmitting through the polarizing plates, when light is incident in the direction given by polar angle of 15° and azimuth angle of 0°, and $Hv_{15}(90°)$ represents luminance of light transmitting through the polarizing plates when light is incident in the direction given by polar angle of 15° and azimuth angle of 90°, and $Hv_{15}(0°)$ and $Hv_{15}(90°)$ are given in $cd/m^2$.

<3> The optical film of <1> or <2>, which further satisfies Formula IV below:

$$(Rth(60° C.90\%) - Rth(Fresh))/Rth(Fresh) \leq 0.05 \qquad \text{Formula IV}$$

in the formula, Rth(60° C.90%) represents thicknesswise retardation of the optical film bonded to a glass plate, measured at a wavelength of 550 nm after the optical film allowed to stand in a 60° C./90% relative humidity environment for 24 hours and further in a 25° C./60% relative humidity environment for 6 hours; and Rth(Fresh) represents thicknesswise retardation of the optical film bonded to a glass plate, measured at a wavelength of 550 nm after the optical film allowed to stand in a 25° C./60% relative humidity environment for 6 hours.

<4> The optical film of any one of <1> to <3>, wherein dimensional change rate of the optical film in the direction of slow axis and/or in the perpendicular direction satisfies Formula V below:

$$-1.0\% \leq \{(L'-L0)/L0\} \times 100 \leq -0.5\% \qquad \text{Formula V}$$

in the formula, L0 represents length of the optical film after conditioned in a 25° C./60% relative humidity atmosphere for 2 hours; and L' represents length of the optical film after allowed to stand at 60° C./90% relative humidity environment for 24 hours, and further conditioned in a 25° C./60% relative humidity atmosphere for 2 hours.

<5> The optical film of any one of <1> to <4>, which satisfies Formula VI and Formula VII below:

$$30 \text{ nm} \leq Re(550) \leq 80 \text{ nm} \qquad \text{Formula VI}$$

$$90 \text{ nm} \leq Rth(550) \leq 300 \text{ nm} \qquad \text{Formula VII}$$

where, Re(550) represents in-plane retardation of the optical film measured at a wavelength of 550 nm, and Rth(550) represents thicknesswise retardation of the optical film measured at a wavelength of 550 nm.

<6> A polarizing plate which comprises the optical film described in any one of <1> to <5>, and a polarizer.

<7> A liquid crystal display device which comprises the optical film described in any one of <1> to <5>, or the polarizing plate described in <6>.

<8> The liquid crystal display device of <7>, wherein the liquid crystal display device comprises a liquid crystal cell held between a pair of polarizing plates, each polarizing plate comprises an optical film, a polarizer, and a protective film arranged in this order from the side of the liquid crystal cell, the liquid crystal cell has a degree of depolarization of 0.02% or less when observed from the front, and at least one of the optical films is the optical film described in any one of <1> to <5>.

Advantageous Effects of Invention

According to this invention, an optical film which is thin and is capable of showing high hygrothermal durability and high front contrast; and a polarizing plate and a liquid crystal display device which comprise the optical film, may be provided.

DESCRIPTION OF EMBODIMENTS

Figure 1:
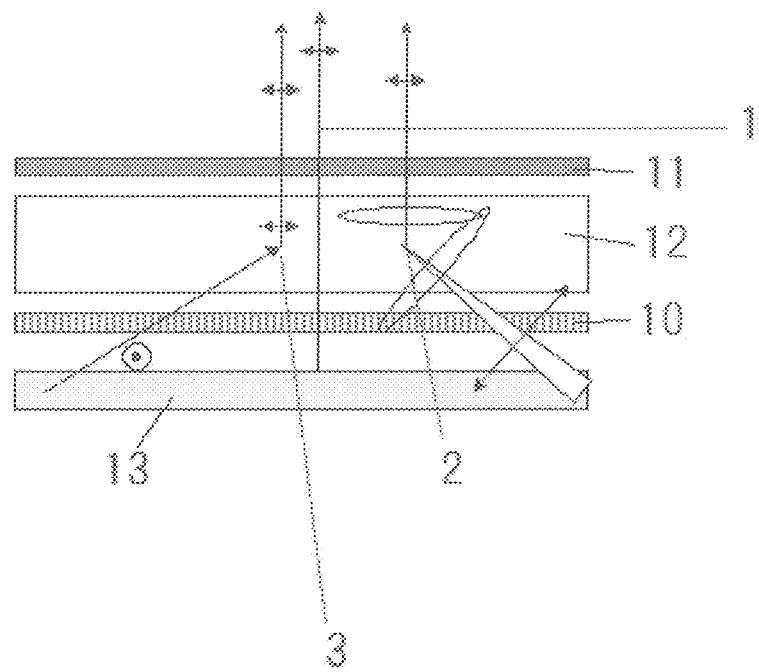
FIG. 1 A schematic drawing illustrating factors of degrading the front contrast.

This invention will be detailed below. Explanation of constituent features will occasionally be made on representative embodiments or specific examples of this invention, to which this invention is by no means limited. In this specification, all numerical ranges expressed using "to" with preceding and succeeding numerals are defined to contain these numerals as the lower and upper limit values.

In this specification, $Re(\lambda)$ and $Rth(\lambda)$ represent in-plane retardation (nm) and thicknesswise retardation (nm), respectively, at a wavelength of $\lambda$. In this specification, the wavelength $\lambda$ is 550 nm unless otherwise specifically noted. $Re(\lambda)$ is measured using KOBRA 21ADH or WR, or KOBRA CCD (from Oji Scientific Instruments), by making a light of $\lambda$ nm in wavelength incident in the direction of normal line on the film.

For the case where the film to be measured is represented by a uniaxial or biaxial refractive index ellipsoid, $Rth(\lambda)$ may be calculated by the procedures below.

In the calculation of $Rth(\lambda)$, $Re(\lambda)$ is measured while varying the angle of inclination of an incident light of $\lambda$ nm in wavelength, over the range from the direction of normal line on the film up to 50° inclination on one side at 10-degree steps, at 6 points in total, assuming the in-plane slow axis (determined by KOBRA 21ADH or WR, or by KOBRA CCD Series) as the axis of inclination (axis of rotation) (for the film having no slow axis, an arbitrary in-plane direction is assumed as the axis of rotation), and $Rth(\lambda)$ is then calculated by KOBRA 21ADH or WR, or by KOBRA CCD Series based on the thus-measured retardation values, a hypothetical value of average refractive index, and an entered value of thickness of film.

In the above procedures, if the film has a direction defined by a certain angle of inclination from the normal line direction, along which the retardation will have a value of zero, while assuming the in-plane slow axis as the axis of rotation, KOBRA 21ADH or WR, or KOBRA CCD Series calculates a retardation value at any angle of inclination larger than such angle of inclination after changing the sign to minus. Measurement wavelength $\lambda$ nm is selectable by manually exchanging the wavelength selective filter, or by programmed conversion of the measured value.

Rth may alternatively be calculated by measuring retardation values in two arbitrarily-inclined directions while assuming the slow axis as the axis of inclination (axis of rotation) (for the film having no slow axis, an arbitrary in-plane direction is assumed as the axis of rotation), and $Rth(\lambda)$ is then calculated based on the thus-measured retardation values, a hypothetical value of average refractive index, and an entered value of thickness of film, according to the Formula (X) and Formula (XI) below:

$$Re(\theta) = \left[ nx - \frac{(ny \times nz)}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$

Formula (X)

$$Rth = \{(nx+ny)/2 - nz\} \times d$$

Formula (XI)

Re(θ) represents a retardation value measured in the direction inclined by angle θ from the normal line direction. Again in the formula, nx represents in-plane refractive index in the direction of slow axis, ny represents in-plane refractive index in the direction perpendicular to nx, and nz represents refractive index in the direction perpendicular to nx and ny. d Represents the thickness of film.

For the film to be measured incapable of being represented by a uniaxial or biaxial ellipsoid, to put it more plainly, a film having no optic axis, Rth(λ) may be calculated by the procedures below:

In the calculation of Rth(λ), Re(λ) is measured while varying the angle of inclination of an incident light of λ nm in wavelength, over the range from −50° inclination to 50° inclination on both sides of the direction of the normal line on the film at 10-degree steps, at 11 points in total, assuming the in-plane slow axis (determined by KOBRA 21ADH or WR, or by KOBRA CCD Series) as the axis of inclination (axis of rotation), and Rth(λ) is then calculated by KOBRA 21ADH or WR, or by KOBRA CCD Series based on the thus-measured retardation values, a hypothetical value of average refractive index, and an entered value of thickness of the film.

For the measurement described above, the hypothetical value of average refractive index can be referred to the catalog-listed values of various optical films in Polymer Handbook (John Wiley & Sons, Inc.). For any optical film with the average refractive index thereof unknown, the average refractive index can be measured using an Abbe's refractometer. Values of the average refractive index of major optical films are given below:

Cellulose acylate (1.48), cycloolefin polymer (1.52), polycarbonate (1.59), poly(methyl methacrylate) (1.49), polystyrene (1.59).

When entered with the hypothetical value of average refractive index and the thickness of film, KOBRA 21ADH or WR, or KOBRA CCD Series calculates nx, ny and nz. Using such calculated nx, ny and nz, Nz=(nx-nz)/(nx-ny) is further calculated.

The retardation may alternatively be measured using AxoScan (from Axometrics, Inc.).

In this invention, the "slow axis" of the retardation film and so forth means the direction along which the refractive index appears maximized. Values of the refractive index are obtained at a measurement wavelength λ of 550 nm in the visible region, unless otherwise specifically noted.

In this specification, any values and numerical ranges which specify optical properties of the individual components, including retardation film and liquid crystal layer, are understood to be values, numerical ranges and properties generally allowed for the liquid crystal display device and components used therefor.

In this specification, weight-average molecular weight is defined by polystyrene equivalent value measured by gel permeation chromatography (GPC). In this specification, weight-average molecular weight (Mw) and number-average molecular weight (Mn) may be determined using, for example, HLC-8220 (from Tosoh Corporation) equipped with TSKgel Super AWM-H column (from Tosoh Corporation), 6.0 mm ID×15.0 cm. The eluent used for the measurement is a 10 mmol/L lithium bromide solution in NMP (N-methylpyrrolidinone) unless otherwise specifically noted.

[Optical Film]

The optical film of this invention comprises cellulose acylate whose degree of substitution of acyl group is from 2.0 to 2.6 and at least one optical performance developer, the optical film has a thickness of 40 μm or thinner, the cellulose acylate has a mannose content of 0.2% by mass or less, and the optical film satisfies Formula I and Formula II below:

$$M_A \geq M_B \times 1.1$$ Formula I $$C_A \geq C_B \times 1.1$$ Formula II in the formulae, A denotes the depthwise region ranging from one surface up to 2 μm depth of the optical film, and B denotes the depthwise region ranging from the other surface up to 2 μm depth of the optical film, and $M_A$ represents the mannose content in the region A, $M_B$ represents the mannose content in the region B; $C_A$ represents the content of the optical performance developer in the region A, and $C_B$ represents the content of optical performance developer in the region B; and $M_A$, $M_B$, $C_A$ and $C_B$ are given in % by mass.

The optical film of this invention may be used as an optically-compensatory film.

In a liquid crystal display device having the optical film of this invention, leakage of light in oblique directions may be suppressed, and thereby high hygrothermal durability and high front contrast may be achieved. The optical film of this invention, having only a small content of impurity such as mannose, less suffers from bright dots, and is unlikely to produce internal haze. By also reducing the content of optical performance developer in the side where the mannose content is kept low in the thickness wise direction of the film (region B), the internal haze may further be reduced, foreign matters causative of bright dots may be suppressed, and depolarized scattering may be suppressed. While the mechanism remains unclear, the impurity such as mannose possibly acts just like an agent for compatibilizing cellulose acylate and the optical performance developer, and supposed to reduce the depolarized scattering.

<Properties of Optical Film>

(Mannose Content)

The optical film of this invention has a mannose content in cellulose acylate of 0.2% by mass or less, more preferably 0.15% by mass or less, and furthermore preferably 0.1% by mass or less. The lower limit value of the mannose content is not specifically limited, and even may be 0% by mass.

By limiting the mannose content to 0.2% by mass or less, the depolarized scattering (Hv) value may be suppressed, the bright dots may be reduced, and thereby the internal haze may be suppressed.

The mannose content in cellulose acylate may be determined by a method described in paragraphs [0008] to [0009] of JP-A-H10-130301. More specifically, 200 mg of a dried sample is precisely weighed, 3 ml of a 72% by mass sulfuric acid is added, and the mixture is sonicated under cooling on icy water over two hours or more so as to completely solubilize the sample. To the obtained solution, 39 ml of distilled water was added, the mixture is thoroughly shaken, refluxed under nitrogen gas flow at 110° C. for 3 hours, and allowed to stand for 30 minutes. Next, 14 g of barium carbonate is added, and the mixture is sonicated under cooling on icy water for neutralization. Thirty minutes after, an additional 10 g of barium carbonate is added to proceed neutralization down to pH5.5 to 6.5 or around, and the mixture is filtered. The filtrate is diluted 100 fold with ultrapure water, to thereby prepare a sample. The sample is analyzed by chromatography according to the conditions below:

High-performance liquid chromatography (HPLC, Model DX-AQ, from Dionex Corporation)
Detector: pulsed amperometric detector (gold electrode)
Column: CarboPac PA-1 (250×4 mm), from Dionex Corporation
Eluent: 2 mM NaOH
Flow rate: 1.0 ml/min
Post-column: Model AMMS-II, from Dionex Corporation Molar ratio of mannose may be determined from a standard curve preliminarily prepared using mannose preparations.

(Regarding Formula I and Formula II)

The optical film of this invention satisfies Formula I and Formula II below, preferably satisfies Formula I-1 and Formula II-1 below, and more preferably satisfies Formula I-2 and Formula II-2 below:

$$M_A \geq M_B \times 1.1 \quad \text{Formula I}$$

$$C_A \geq C_B \times 1.1 \quad \text{Formula II}$$

$$M_A \geq M_B \times 1.14 \quad \text{Formula I-1}$$

$$C_A \geq C_B \times 1.11 \quad \text{Formula II-1}$$

$$M_A \geq M_B \times 1.17 \quad \text{Formula I-2}$$

$$C_A \geq C_B \times 1.12 \quad \text{Formula II-2}$$

In the formulae, A denotes the depthwise region ranging from one surface up to 2 μm depth of the optical film, and B denotes the depthwise region ranging from the other surface up to 2 μm depth of the optical film, and $M_A$ represents the mannose content in the region A, $M_B$ represents the mannose content in the region B; $C_A$ represents the content of the optical performance developer in the region A, and $C_B$ represents the content of optical performance developer in the region B; and $M_A$, $M_B$, $C_A$ and $C_B$ are given in % by mass.

In the optical film of this invention, as specified by Formula I and Formula II, the mannose-rich side (region A) and the optical performance developer-rich side (region A) fall in the same side. In other words, the mannose-rich side (region A) has a larger content of optical performance developer, and the mannose-poor side (region B) has a less content of optical performance developer. With such configuration, the Hv value of the optical film may be reduced, and the front contrast may be enhanced.

The mannose contents ($M_A$ and $M_B$) in the region A and the region B may be determined as follows.

The manufactured film is scraped on both sides from the individual surfaces to a depth of 2 μm using a cutting edge, and the collected powders are analyzed to determine the mannose content, in the same way as the method of measuring the mannose content in cellulose acylate described above. The area of film scraped with the cutting edge may typically be 100 to 400 cm², although not specifically limited. Assuming the mannose-rich side as the region A, and assuming the mannose-poor side as the region B, $M_A$ and $M_B$ may be determined.

The content of the optical performance developer ($C_A$ and $C_B$) in the region A and region B may be determined as follows.

The film is scraped on both sides from the individual surfaces to collect the powders, in the same way as the method of determining $M_A$ and $M_B$. The amounts of optical performance developer contained in the powders thus collected from the region A and the region B are respectively quantified as described below, to thereby determine $C_A$ and $C_B$.

For the optical performance developer which absorbs UV light when dissolved into solution, the content thereof may be calculated based on the absorbance. Ten milligrams of powder collected from one surficial region of the film is dissolved into 50 ml of a dichloromethane/methanol=90/10 mixed solution, and the absorbance of the solution is measured using UV3150 (from Shimadzu Corporation). The content of the optical performance developer may be quantified by preparing a standard curve using the optical performance developer. Also the content in the other surficial region of the film may be measured in the same way as for the one surficial region.

The content of the optical performance developer, even if not quantifiable by the method described above, may be calculated by HPLC (High-Performance Liquid Chromatography) under the conditions listed below:

Apparatus: High-performance liquid chromatography (HPLC, Agilent HP1100, from Agilent Technologies Inc.)
Column: Imtakt Cadenza CD-C18, 2.0×150 mm
Flow rate: 0.2 ml/min
Injection volume: 3 μl By preparing a standard curve by the method described above, the content of optical performance developer showing no UV absorption may be quantified.

For the case where the optical film of this invention contains two or more optical performance developers, it is preferable that each of the optical performance developers independently satisfies Formula II.

(Film Thickness)

The thickness of the optical film of this invention is 40 μm or thinner, preferably 38 μm or thinner, and more preferably 35 μm or thinner. The lower limit of film thickness is generally 5 μm, although not specifically limited. Even with a thickness of 40 μm or thinner, the optical film of this invention can improve the front contrast.

(Hv-Value)

The Hv-value of the optical film of this invention preferably satisfies Formula III below, more preferably satisfies Formula III-1, and furthermore preferably satisfies Formula III-2.

$$Hv_{15}(0°,90°) \leq 10 \times 10^{-3} \quad \text{Formula III}$$

$$Hv_{15}(0°,90°) \leq 8.0 \times 10^{-3} \quad \text{Formula III-1}$$

$$Hv_{15}(0°,90°) \leq 7.0 \times 10^{-3} \quad \text{Formula III-2}$$

In the formula, $Hv_{15}(0°,90°)=(Hv_{15}(0°)+Hv_{15}(90°))/2$, wherein $Hv_{15}(0°)$ and $Hv_{15}(90°)$ are measured with an arrangement of "polarizing plate/optical film/polarizing plate" with the absorption axes orthogonally arranged, and azimuth angle of 0° is defined in the direction of slow axis of the optical film, and $Hv_{15}(0°)$ represents luminance of light transmitting through the polarizing plates, when light is incident in the direction given by polar angle of 15° and azimuth angle of 0°, and $Hv_{15}(90°)$ represents luminance of light transmitting through the polarizing plates when light is incident in the direction given by polar angle of 15° and azimuth angle of 90°, and $Hv_{15}(0°)$ and $Hv_{15}(90°)$ are given in $cd/m^2$.

Figure 3:
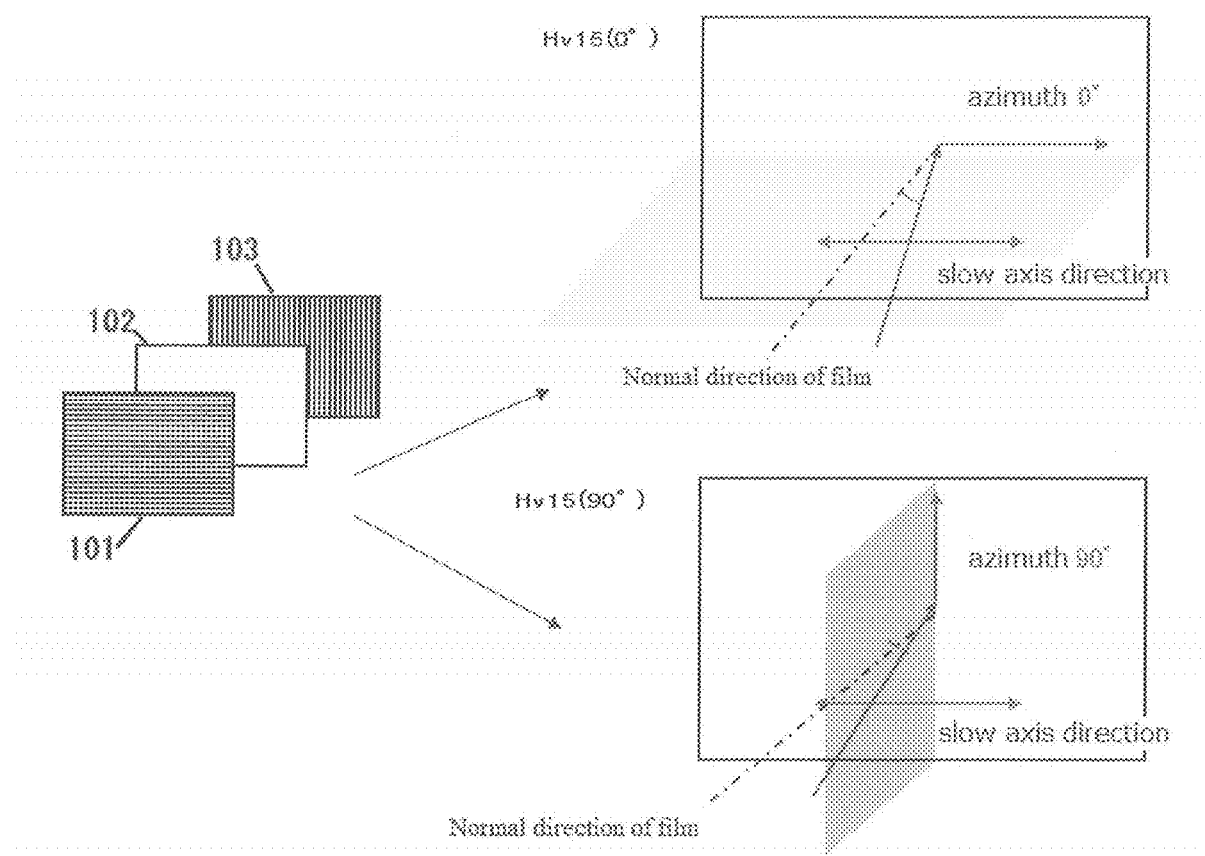
FIG. 3 A drawing illustrating a method of measuring $Hv_{15}(0°)$ and $Hv_{15}(90°)$.

The left drawing in FIG. 3 illustrates a configuration in which a film is disposed between polarizing plates with the perpendicularly arranged absorption axes. The upper right drawing of FIG. 3 illustrates the case where light is incident in the direction given by polar angle=15° and azimuth=0°, assuming the direction of the slow axis of the optical film as azimuth=0° (the polar angle may alternatively be taken in the opposite direction but within the halftoned plane); and the lower right drawing of FIG. 3 illustrates the case where light is incident in the direction given by polar angle=15° and azimuth=90°, assuming the direction of the slow axis of the optical film as azimuth=0° (the polar angle may alternatively be taken in the opposite direction but within the halftoned plane). The optical film (102 in FIG. 3) was arranged between two polarizing plate which are orthogonal with each other (101 and 103 in FIG. 3). The optical film was arranged so that the direction of the slow axis of the optical film is parallel to the absorption axis of the polarizing plate 101.

The Hv value represents the amount of scattering on a sample relative to polarized light, and is measured by placing the sample between the polarizing plates crossed perpendicularly. The method of measurement may follow a method described in "Purasuchikku Seikei-hin no Koji Kozo Kaizeki Nyumon, in Japanese, (A Guide to Higher-Order Structural Analysis of Plastic Molded Product), (published by Nikkan Kogyo Shimbun, Ltd.)", p 25-27. In this invention, the Hv value is measured by making a light with a luminance of 10000 (1×·s) in the direction given by polar angle=15°, assuming the direction of the slow axis of the optical film as azimuth=0°.

A small Hv value of the film means that the film will show less leakage of incident light in an oblique direction in the black display, and it is preferred since the front contrast can be increased consequently.

Depolarization of film has been known as a causal factor which affects the front contrast of liquid crystal display device. This is observable as leakage of light when light is made incident from the normal line direction, while placing, as typically illustrated in FIG. 1, a film 12 between a pair of polarizing plates 10, 11 with the absorption axes crossed normally. For example, as indicated by reference numeral "1" in FIG. 1, when the film is disposed between the pair of polarizing plates with the absorption axes crossed normally, and the light is made incident thereon from the normal line direction, if there were micro-shifts of axis in the film as typically illustrated in FIG. 2, the state of polarization of the transmitted light will have in-plane distribution 14, which results in depolarization.

Besides the influence of such depolarization on the front contrast, also influence of an obliquely incident light on the film is not negligible, since a back light source of the liquid crystal display is a diffusion light source 13.

Internal haze of the film has been known as one factor of frontward scattering of obliquely incident light on the film. As typically indicated by reference numeral "2" in FIG. 1, if a scattering factor resided in the film, obliquely incident light (at an angle different from that of the absorption axes of the upper and lower polarizing plates) is scattered frontward. The scattered light has a varied state of polarization due to retardation of the optical film, transmits through the polarizing plate on the viewer's side to cause leakage of light, and degrades the front contrast. Any craze or aggregation of an optical performance developer in the film may be a causal factor of the internal haze.

Figure 2:
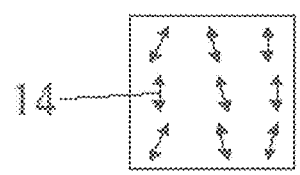
FIG. 2 A drawing illustrating an in-plane distribution of state of polarization of transmitted light over a film.

Meanwhile, as indicated by reference numeral "3" in FIG. 1, it has been gradually known that any scattering factor accompanied by depolarization, if resided in the film, can remarkably degrade the front contrast. Since the scattering is accompanied by depolarization, even a quantity of light smaller than that of scattering due to the internal haze may largely affect the front contrast.

While the reason for scattering remains unclear, possible causes include residence of fine birefringent contaminant, micro-nonuniformity of concentration of optical performance developer in the film, and micrononuniformity of density of polymer.

(Optical Changes after Aged at 60° C., 90%)

The optical film of this invention preferably satisfies Formula IV, more preferably satisfies Formula IV-1, and furthermore preferably satisfies Formula IV-2 below:

$$(Rth(60° C.90\%)-Rth(Fresh))/Rth(Fresh) \leq 0.05 \quad \text{Formula IV}$$

$$(Rth(60° C.90\%)-Rth(Fresh))/Rth(Fresh) \leq 0.04 \quad \text{Formula IV-1}$$

$$(Rth(60° C.90\%)-Rth(Fresh))/Rth(Fresh) \leq 0.03 \quad \text{Formula IV-2}$$

In the formula, Rth(60° C.90%) represents thicknesswise retardation of the optical film bonded to a glass plate, measured at a wavelength of 550 nm after the optical film allowed to stand in a 60° C./90% relative humidity environment for 24 hours and further in a 25° C./60% relative humidity environment for 6 hours; and Rth(Fresh) represents thicknesswise retardation of the optical film bonded to a glass plate, measured at a wavelength of 550 nm after the optical film allowed to stand in a 25° C./60% relative humidity environment for 6 hours; and Rth represents thicknesswise retardation of the optical film measured at 550 nm. The thickness of the glass plate is preferably 0.3 mm to 3.0 mm, although not specifically limited.

If (Rth(60° C.90%)−Rth(Fresh))/Rth is 0.05 or less, the optical film may be suppressed from causing hue changes in oblique directions more effectively, even after being allowed to stand in the 60° C./90% relative humidity environment.

Rth(60° C.90%) may be measured, for example, using AxoScan (from Axometrics, Inc.), after the optical film is bonded to a glass plate (Eagle XG, Corning) by SK-2057 (Soken Chemical & Engineering Co. Ltd) and allowed to stand at 60° C., 90% for 24 hours, and further in the 25° C./60% relative humidity environment for 6 hours.

Rth(Fresh) may be measured, for example, using AxoScan (from Axometrics, Inc.), after the optical film is bonded to a glass plate (Eagle XG, Corning) by SK-2057 (Soken Chemical & Engineering Co. Ltd) and allowed to stand in the 25° C./60% relative humidity environment for 6 hours.

(Dimensional Change Rate)

As for the optical film of this invention, dimensional change rate in the direction of slow axis of the optical film and/or in the direction perpendicular thereto preferably satisfies Formula V, more preferably satisfies Formula V-1, and furthermore preferably satisfies Formula V-2.

$$-1.0\% \leq \{(L'-L0)/L0\} \times 100 \leq -0.5\% \quad \text{Formula V}$$

$$-0.95\% \leq \{(L'-L0)/L0\} \times 100 \leq -0.55\% \quad \text{Formula V-1}$$

$$-0.9\% \leq \{(L'-L0)/L0\} \times 100 \leq -0.6\% \quad \text{Formula V-2}$$

In the formula, L0 represents length of the optical film after conditioned in a 25° C./60% relative humidity atmosphere for 2 hours; and L' represents length of the optical film after allowed to stand at 60° C./90% relative humidity environment for 24 hours, and further conditioned in a 25° C./60% relative humidity atmosphere for 2 hours.

The optical film having a thickness of 40 μm or thinner, used in this invention, may be suppressed from causing non-uniformity after kept under humidity and heat, if the dimensional change rate is limited to −0.5% or below (large shrinkage). On the contrary, the optical film is suppressed from wrinkling when bonded to the polarizer, if the dimensional change rate is limited to −1.0% or above (small shrinkage).

It has been known that the film having a small dimensional change rate is less likely to cause the non-uniformity even after the liquid crystal display device is exposed in a hot and humid environment. The film with a relatively large thickness has been known to cause the non-uniformity, while largely affected by redisual stress due to dimensional changes of the film. Now, it has been becoming clear that, under a thin thickness of the film, the non-uniformity is less likely to occur, if the film can shrink to some degree after being allowed to stand at 60° C., 90% relative humidity for 24 hours. While the mechanism remains unclear, it is supposed that the thinned film will be more largely affected by shrinkage of the polarizer, so that the non-uniformity becomes less likely to occur by reducing difference in the shrinkage factor relative to the polarizer (film per se shrinks).

The dimensional change rate may be measured specifically by the method below. First, prepared is a film sample of 12 cm long (in the direction of measurement) and 3.5 cm wide, cut from the film so as to align the longitudinal direction to the slow axis of the film, or, a film sample cut from the film so as to align the longitudinal direction to the direction perpendicular thereto. The sample is pierced to form pinholes at 10 cm interval, allowed to be conditioned at 25° C., 60% relative humidity for 2 hours, and then measured regarding the distance between the pinholes using a pin gauge (measured value denoted by L0). Next, the sample is kept under a hot and humid environment at 60° C., 90% relative humidity for 24 hours, further conditioned at 25° C., 60% relative humidity for 2 hours, and the distance between the pinholes are again measured using the pin gauge (measured value denoted by L'). Using these measured values, the dimensional change rate may be calculated according to the equation below. Unit of L' and L0 is not specifically limited so long as the same unit is used for both of them.

$$\text{Dimensional change rate}[\%]=(L'-L0)/L0\}\times 100$$

(Retardation)

The optical film of this invention preferably satisfies Formula VI and Formula VII, more preferably satisfies Formula VI-1 and Formula VII-1, and furthermore preferably satisfies Formula VI-2 and Formula VII-2, below:

| | |
|---|---|
| 30 nm≤$Re$(550)≤80 nm | Formula VI |
| 90 nm≤$Rth$(550)≤300 nm | Formula VII |
| 40 nm≤$Re$(550)≤70 nm | Formula VI-1 |
| 100 nm≤$Rth$(550)≤200 nm | Formula VII-1 |
| 40 nm≤$Re$(550)≤50 nm | Formula VI-2 |
| 100 nm≤$Rth$(550)≤150 nm | Formula VII-2 |

$Re$(550) represents in-plane retardation of the optical film measured at a wavelength of 550 nm, and $Rth$(550) represents thicknesswise retardation of the optical film measured at a wavelength of 550 nm.

<Cellulose Acylate>

The optical film of this invention contains cellulose acylate whose degree of substitution of acyl group is from 2.0 to 2.6.

Cellulose used as a raw material of cellulose acylate includes cotton linter and wood pulp (hardwood pulp, softwood pulp). Cellulose acylate obtained from whichever source cellulose is usable, and a plurality of the cellulose acylate may be used in a mixed manner on occasions. These source celluloses are detailed, for example, in "Purasuchikkku Zairyo Koza (17), Sen'iso-kei Jushi, in Japanese, ("A Course of Plastic Material (17), Cellulose-Base Resin"), by Marusawa and Uda, published by Nikkan Kokyo Shimbun, Ltd. (1970), or Journal of Technical Disclosure No. 2001-1745, p. 7-8, published by Japan Institute of Invention and Innovation.

β-1,4-Bonded glucose unit composing cellulose have free hydroxy groups on the 2-, 3- and 6-positions. The cellulose acylate is a polymer obtained by acylating a part of, or all of, the hydroxy groups with acyl groups. The degree of substitution of acyl group means the total of percentages of acylation of hydroxy groups bound to the 2-, 3-, and 6-positions (100% acylation at the individual positions gives a degree of substitution of 1).

In this invention, the degree of substitution of acyl group in the cellulose acylate is 2.0 to 2.6, preferably 2.1 to 2.5, and furthermore preferably 2.2 to 2.5.

It is preferable that 90% by mass or more, preferably 95% by mass or more, furthermore preferably 96% by mass or more, and particularly all, of the cellulose acylate to be used satisfies the above-described degree of substitution of acyl group.

Acyl group used for acylation of the cellulose may be a single species of acyl group, or two or more species of acyl group. The acyl group preferably has two or more carbon atoms.

The acyl group of the cellulose acylate, having two or more carbon atoms, may be an aliphatic group or may be an aryl group, without special limitation. Specific examples include alkylcarbonyl ester, alkenylcarbonyl ester or aromatic carbonyl ester, and aromatic alkylcarbonyl ester of cellulose, wherein each of them may further have a substituent. Preferable examples include acetyl group, propionyl group, butanoyl group, heptanoyl group, hexanoyl group, octanoyl group, decanoyl group, dodecanoyl group, tridecanoyl group, tetradecanoyl group, hexadecanoyl group, octadecanoyl group, isobutanoyl group, tert-butanoyl group, cyclohexanecarbonyl group, oleoyl group, benzoyl group, naphthyl carbonyl group, and cinnamoyl group. Among them, more preferable examples include acetyl group, propionyl group, butanoyl group, dodecanoyl group, octadecanoyl group, tert-butanoyl group, oleoyl group, benzoyl group, naphthyl carbonyl group, and cinnamoyl group; and particularly preferable examples include acetyl group, propionyl group, butanoyl group (the case where the acyl group has 2 to 4 carbon atoms); and further particularly preferable examples include acetyl group (the case where the cellulose acylate is cellulose acetate).

When acid anhydride or acid chloride is used as an acylation agent in the acylation of cellulose, organic solvent usable as a reaction solvent is exemplified by organic acids such as acetic acid and methylene chloride.

As a catalyst, a protic catalyst such as sulfuric acid is preferably used when acid anhydride is used as the acylating agent, meanwhile a basic compound is preferably used when acid chloride ($CH_3CH_2COCl$, for example) is used as the acylating agent.

Most general industrial synthetic methods of mixed fatty acid ester of cellulose include a method of acylating cellulose using a mixture of organic acid components which contain fatty acid corresponding to acetyl group and other acyl group (acetic acid, propionic acid, valeric acid, etc.) or acid anhydrides thereof.

The cellulose acylate used in this invention may be synthesized according to a method described, for example, in JP-A-H10-45804.

The content of the cellulose acylate in the optical film of this invention is preferably 70% by mass or more of the mass of optical film, more preferably 75% by mass or more, more preferably 80% by mass or more, and particularly 85% by mass or more. While the upper limit of the content of the cellulose acylate is not specifically limited, it is generally 98% by mass, preferably 97% by mass, and more preferably 95% by mass.

<Optical Performance Developer>

The optical film of this invention comprises at least one optical performance developer. The optical performance developer in this invention means an additive capable of increasing Rth(550) of the optical film by 0.1 nm or more, when 1% by mass, relative to the cellulose acylate, of the optical performance developer is added. The optical performance developer is exemplified by sugar ester compound, ester-base compound, and nitrogen-containing compound.

(Sugar Ester Compound)

The optical film of this invention may contain a sugar ester compound as the optical performance developer. The sugar ester compound preferably used here is a compound having 1 to 12 units of at least either one of pyranose structure and furanose structure, and having a part of OH groups in the structure esterified, and/or mixture of such compounds.

In the compound having 1 to 12 units of at least either one of pyranose structure and furanose structure, and having all of, or a part of, OH groups in the structure esterified, the ratio of esterification is preferably 70% or more of OH groups which reside in the pyranose structure or furanose structure.

The sugar ester compound usable in this invention is exemplified by, but not limited to, glucose, galactose, mannose, fructose, xylose, arabinose, lactose, sucrose, nystose, 1F-fructosyl nystose, stachyose, maltitol, lactitol, lactulose, cellobiose, maltose, cellotriose, maltotriose, raffinose and kestose.

Also gentiobiose, gentiotriose, gentiotetraose, xylotriose, and galactosyl sucrose are exemplified.

Among these compounds, compounds having both of the pyranose structure and the furanose structure are particularly preferable.

Such compounds are preferably exemplified by sucrose, kestose, nystose, 1F-fructosyl nystose, and stachyose; and more preferably sucrose.

The monocarboxylic acid used for esterifying all of, or a part of, OH groups in the pyranose structure or furanose structure is selectable from known aliphatic monocarboxylic acid, alicyclic monocarboxylic acid, aromatic monocarboxylic acid and so forth, without special limitation. The carboxylic acid to be used here may be a single species, or any mixture of two or more species.

Preferable examples of the aliphatic monocarboxylic acid include saturated fatty acids such as acetic acid, propionic acid, butyric acid, isobutyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; and unsaturated fatty acids such as undecylenic acid, oleic acid, sorbic acid, linoleic acid, linolenic acid, arachidonic acid, and octenoic acid.

Preferable examples of the alicyclic monocarboxylic acid include acetic acid, cyclopentane carboxylic acid, cyclohexane carboxylic acid, cyclooctane carboxylic acid, and derivatives of them.

Preferable examples of the aromatic monocarboxylic acid include benzoic acid; aromatic monocarboxylic acids configured by introducing an alkyl group or alkoxy group into the benzene ring of benzoic acid, such as toluic acid; cinnamic acid; aromatic monocarboxylic acids having two or more benzene rings, such as benzilic acid, biphenyl carboxylic acid, naphthalene carboxylic acid, and tetralin carboxylic acid; and derivatives of them. More specifically, exemplified are xylic acid, hemellitic acid, mesitylenic acid, prehnitylic acid, γ-isodurylic acid, durylic acid, mesitoic acid, α-isodurylic acid, cuminic acid, α-toluic acid, hydroatropic acid, atropic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, homovanillic acid, homoveratric acid, o-homoveratric acid, phthaloic acid, and p-coumaric acid. Benzoic acid and naphthyl acid are particularly preferable.

Ester compound of oligosaccharide is usable as the compound having 1 to 12 units of at least one of pyranose structure or furanose structure.

The oligosaccharide is manufactured by allowing an enzyme such as amylase to act on starch, sucrose or the like. The oligosaccharide applicable to this invention is exemplified by maltooligosaccharide, isomaltooligosaccharide, fructooligosaccharide, galactooligosaccharide, and xylooligosaccharide.

The sugar ester compound is a compound obtained by condensing 1 or more and 12 or less units of at least either one of pyranose structure or furanose structure represented by Formula (A) below, where each of $R_{11}$ to $R_{15}$, and each of $R_{21}$ to $R_{25}$ represents an acyl group having 2 to 22 carbon atoms, or a hydrogen atom, each of m and n independently represents an integer of 0 to 12, and (m+n) represents an integer of 1 to 12.

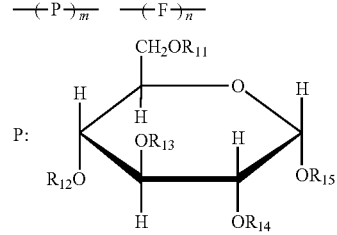

Formula (A)

-continued

F: 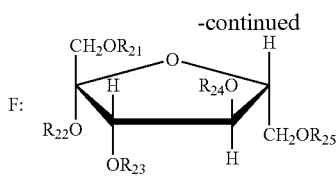

Each of $R_{11}$ to $R_{15}$, and each of $R_{21}$ to $R_{25}$ is preferably a benzoyl group, hydrogen atom, or acetyl group. The benzoyl group and acetyl group may further have substituent $R_{26}$, such as alkyl group, alkenyl group, alkoxy group and phenyl group, wherein such alkyl group, alkenyl group and phenyl group may further have a substituent. Also oligosaccharide may be manufactured in the same way as the sugar ester compound described above.

Specific examples of the sugar ester compound are enumerated below, but not limited thereto.

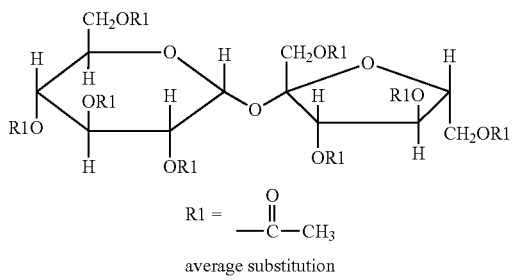

A-1

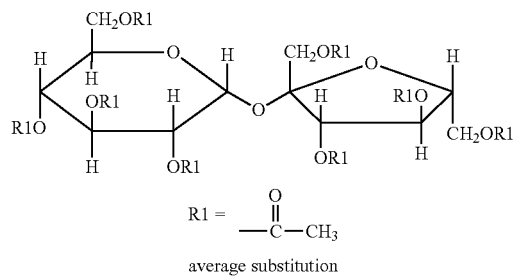

A-2

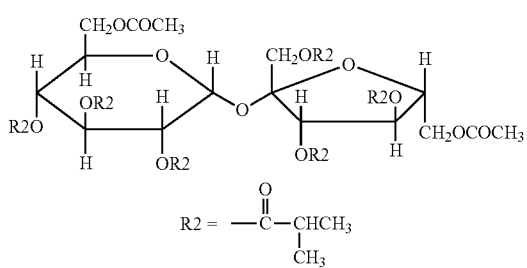

A-3

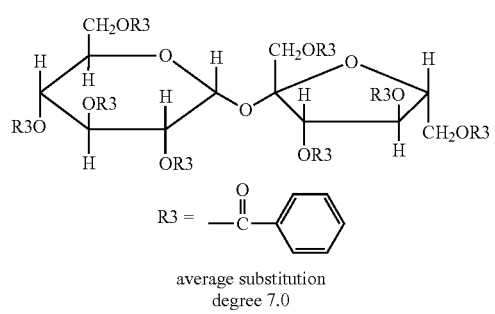

A-4

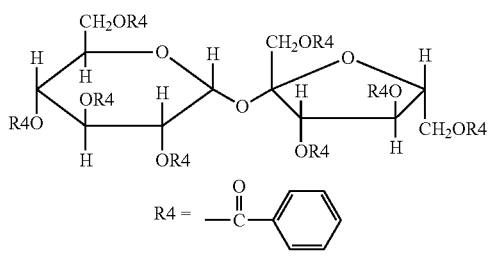

A-5

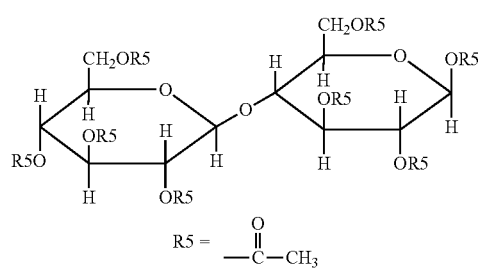

A-6

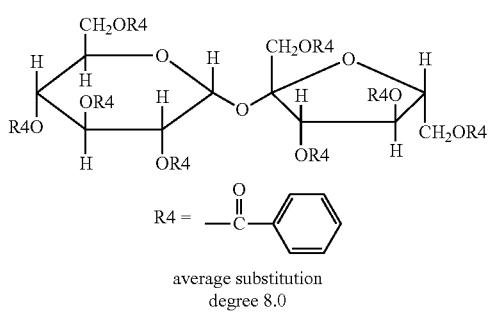

A-7

A-8

-continued
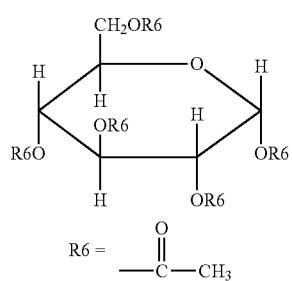
A-9
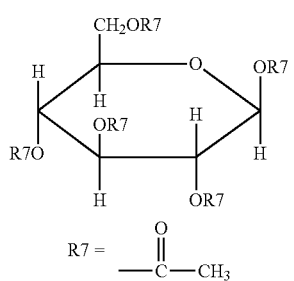
A-10
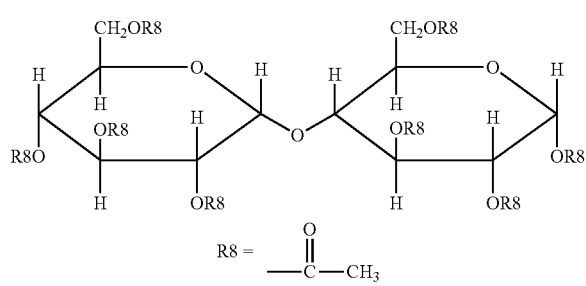
A-11
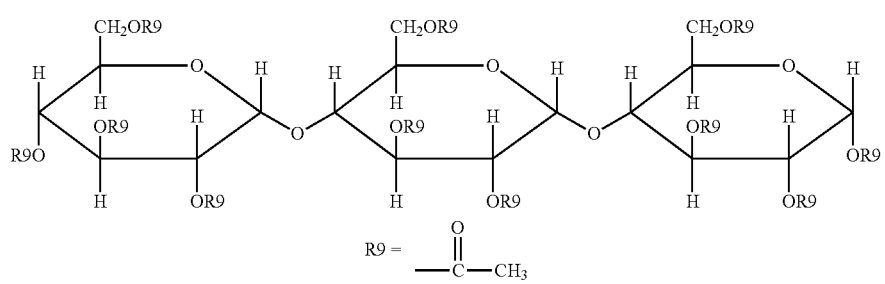
A-12
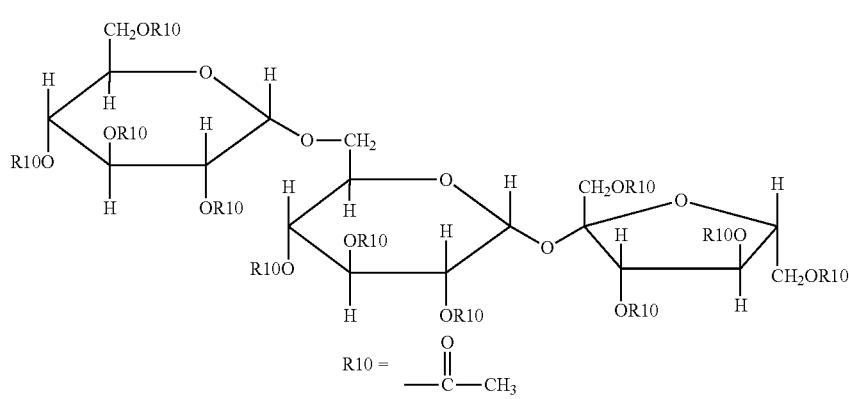
A-13
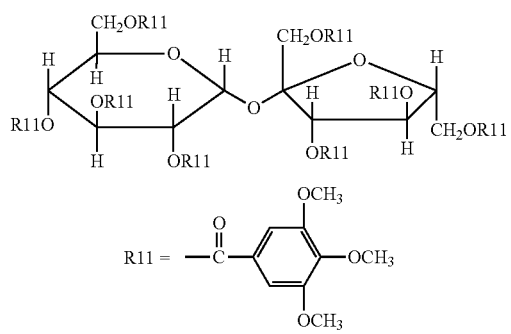
A-14
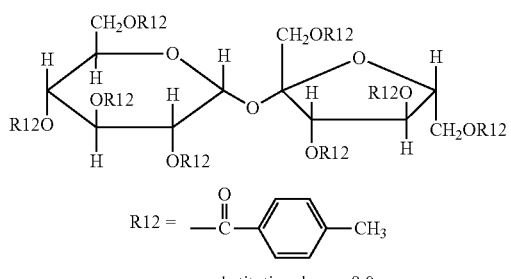
A-15
average substitution degree 8.0

-continued
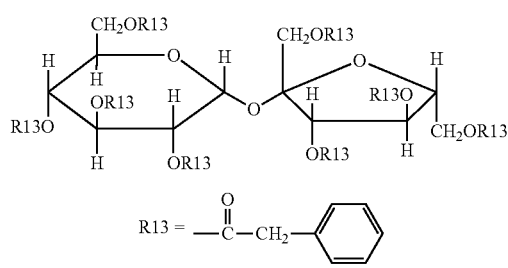
A-16
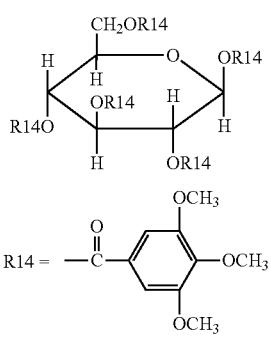
A-17
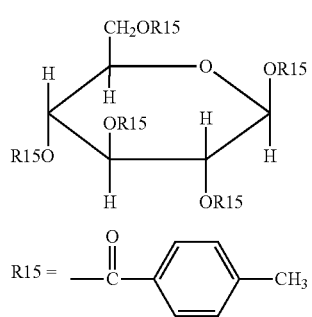
A-18
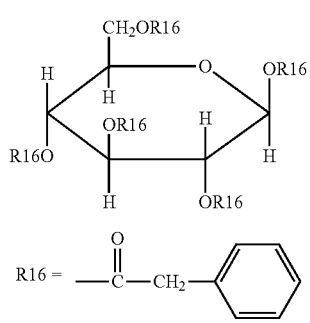
A-19
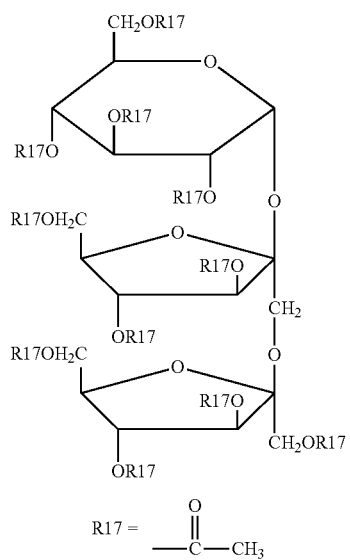
A-20
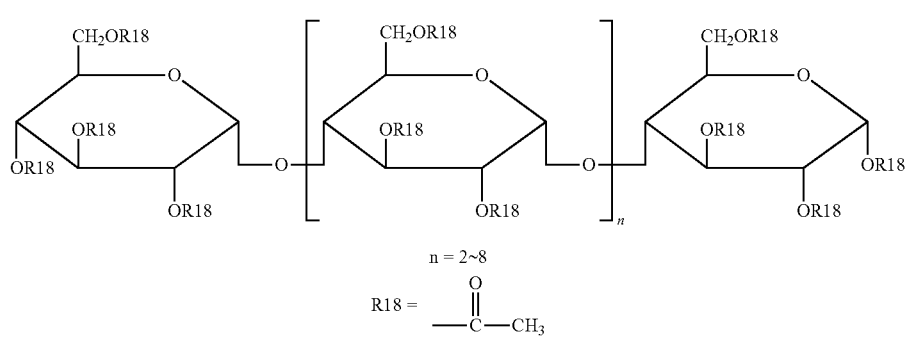
A-21

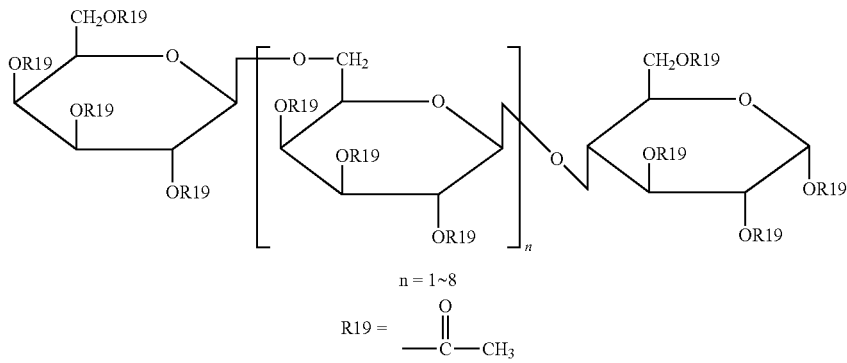
A-22
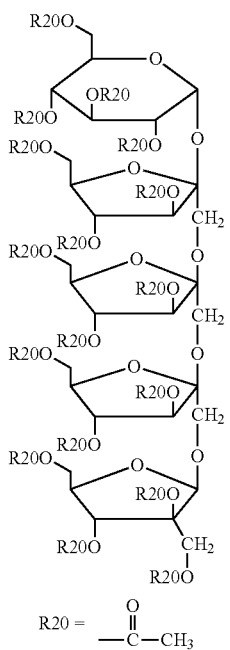
A-23
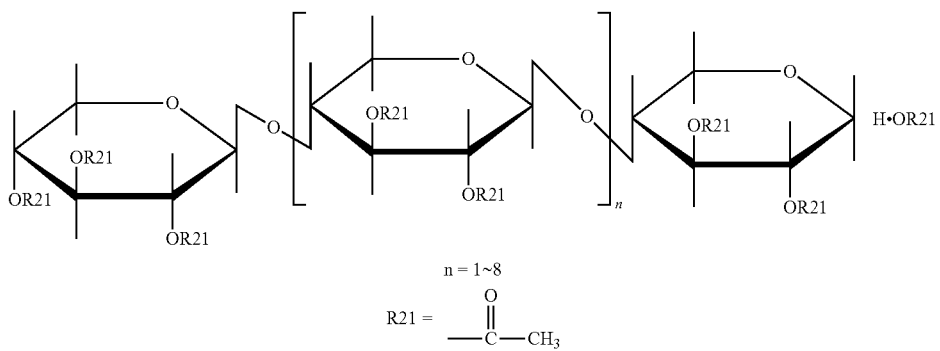
A-24

A-25

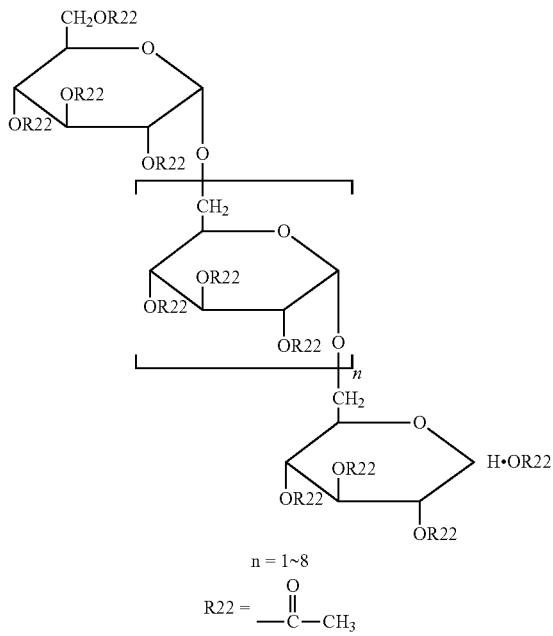

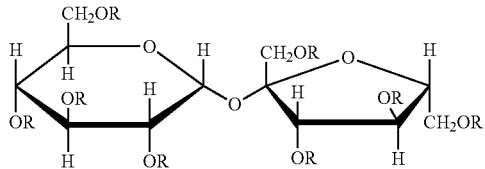

In the formula, R represents an acetyl group.
Also a sugar ester compound shown below is usable.

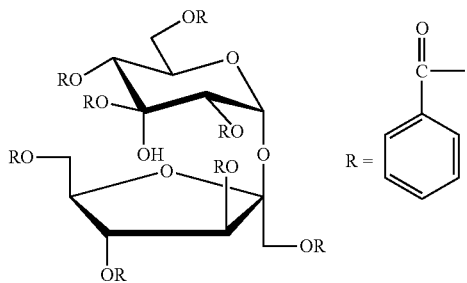

When the optical film of this invention contains the sugar ester compound, the content of the sugar ester compound is preferably 0.5 to 30% by mass relative to the mass of cellulose acylate, and is more preferably 2 to 15% by mass.
(Ester-Base Compound)

The optical film of this invention may also contain an ester-base compound as the optical performance developer. More specifically, a polycondensed ester of dicarboxylic acid and diol is preferably contained.

The polycondensed ester may be obtained by any of known methods, such as dehydration condensation reaction between polybasic acid and polyhydric alcohol, or, addition and dehydration condensation reaction of dibasic acid anhydride to polyhydric alcohol, and is preferably a polycondensed ester formed by dibasic acid and diol, and derivative thereof.

The number-average molecular weight (Mn) of the polycondensed ester in this invention may be determined by gel permeation chromatography (GPC) as described previously in this specification. In this invention, the number-average molecular weight of the polycondensed ester is preferably 2500 or less, more preferably 400 to 2500, particularly 500 to 2300, and most preferably 600 to 2000.

The polycondensed ester in this invention preferably has a ratio of content (mass fraction) of component having a molecular weight of 500 or less of less than 8%, and more preferably less than 7%. The ratio of content of component having a molecular weight of 500 or less may be determined by gel permeation chromatography (GPC). Methods of suppressing the ratio of content of the low-molecular-weight component to less than 8% include distillation such as general vacuum distillation and thin film (molecular) distillation, and chromatography. Thin film distillation, capable of removing the low-molecular-weight component within a short time, is preferable.

The dibasic acid composing the polycondensed ester is preferably exemplified by dicarboxylic acid.

The dicarboxylic acid is exemplified by aliphatic dicarboxylic acid, aromatic dicarboxylic acid, and so forth. While whichever dicarboxylic acid is usable, it is particularly preferable to use aromatic dicarboxylic acid. By mixing such polycondensed ester, the retardation will appear more efficiently.

The polycondensed ester used in this invention preferably has, independently at each of both terminals, any one functional group selected from the group consisting of —OH group, —O—C(═O)—$R^1$ group, —C(═O)—O—$R^2$ group, —O—$R^3$ group and —COOH group (where, each of $R^1$ to $R^3$ independently represents an aliphatic group).

In this specification, residue of the polycondensed ester means a partial structure of the polycondensed ester, wherein the partial structure retains a specific feature of the monomer composing the polycondensed ester. For example, a dicarboxylic acid residue derived from dicarboxylic acid HOOC—R—COOH is given as —OC—R—CO—, and a diol residue derived from diol HO—R'—OH is given as —O—R'—O—.

The polycondensed ester contains the dicarboxylic acid residue and the diol residue, wherein either one of the dicarboxylic acid residue or the diol residue necessarily has an aromatic group.

For the polycondensed ester, usable as the dicarboxylic acid residue are aromatic dicarboxylic acid residue and aliphatic dicarboxylic acid residue.

The polycondensed ester used in this invention preferably contains at least one species of aromatic dicarboxylic acid residue.

Ratio of content of the aromatic dicarboxylic acid residue, relative to the total dicarboxylic acid residues in the polycondensed ester used in this invention, is preferably 50% by mole or more.

By controlling the ratio of content of the aromatic dicarboxylic acid residue to 50% by mole or more, the cellulose acylate film, capable of showing a sufficient level of optical performance only with a thin thickness (in particular, large Rth per unit film thickness), tends to be obtained more easily.

In this specification, the aromatic dicarboxylic acid residue means dicarboxylic acid residue having at least one arylene group. More specifically, the aromatic dicarboxylic acid residue in this specification includes, besides —OC—Ar—CO— residue, for example, dicarboxylic acid residues having structures such as —OC—Ar'-L-CO—, —OC-L'-Ar"—CO—, and —OC-L"-Ar'"-L"-CO— (each of Ar, Ar', Ar" and Ar'" independently represents an arylene group, and each of L, L' and L" independently represents a divalent linking group other than arylene group).

The divalent linking group other than arylene group is exemplified by aliphatic group and linking atom, and is more specifically exemplified by alkylene group, alkylenoxy group, oxygen atom, and sulfur atom.

Among them, the aromatic dicarboxylic acid residue preferably has a structure of —OC—Ar—CO—, from the viewpoint of compatibility with the cellulose acylate.

Ar preferably represents an arylene group having 6 to 16 carbon atoms, more preferably an arylene group having 6 to 12 carbon atoms, particularly a phenylene group or naphthylene group, and more particularly phenylene group. Ar may further have a substituent, or may have no substituent. Ar preferably has no substituent. The substituent is exemplified by a hydroxyl group, acyl group, and carbonyl group.

The aromatic dicarboxylic acid residue is specifically exemplified by phthalic acid residue, terephthalic acid residue, isophthalic acid residue, 1,5-naphthalene dicarboxylic acid residue, 1,4-naphthalene dicarboxylic acid residue, 1,8-naphthalene dicarboxylic acid residue, 2,8-naphthalene dicarboxylic acid residue and 2,6-naphthalene dicarboxylic acid residue. Among them, phthalic acid residue, terephthalic acid residue, 2,6-naphthalene dicarboxylic acid residue are preferable; phthalic acid residue and terephthalic acid residue are more preferable; and terephthalic acid residue is furthermore preferable.

The polycondensed ester will have formed therein the aromatic dicarboxylic acid residue which is derived from the aromatic dicarboxylic acid used for the mixing.

When the polycondensed ester contains the terephthalic acid residue as the aromatic dicarboxylic acid residue, the the polycondensed ester will have a good compatibility with the cellulose acylate, and thereby the resultant cellulose acylate film will be unlikely to cause breedout of the polycondensed ester during manufacture and hot stretching of the film.

The polycondensed ester may contain a single species, or two or more species, of aromatic dicarboxylic acid residues. For the case where two or more species of aromatic dicarboxylic acid residues are contained in the polycondensed ester, it is preferable that phthalic acid residue and terephthalic acid residue are contained.

The polycondensed ester may contain an aliphatic dicarboxylic acid residue as the dicarboxylic acid residue, besides the aromatic dicarboxylic acid residue.

Specific examples of the aliphatic dicarboxylic acid residue include oxalic acid residue, malonic acid residue, succinic acid residue, maleic acid residue, fumaric acid residue, glutaric acid residue, adipic acid residue, pimelic acid residue, suberic acid residue, azelaic acid residue, sebacic acid residue, dodecane dicarboxylic acid residue and 1,4-cyclohexanedicarboxylic acid residue.

The polycondensed ester will have formed therein the aliphatic dicarboxylic acid residue which is derived from the aliphatic dicarboxylic acid used as mixed.

The aliphatic dicarboxylic acid residue preferably has an average number of carbon atoms of 5.5 to 10.0, more preferably 5.5 to 8.0, and furthermore preferably 5.5 to 7.0. When the aliphatic diol has an average number of carbon atoms of 7.0 or less, the compound may be reduced in the heating loss, and thereby the cellulose acylate web may be prevented from causing surface failure which is supposedly due to process pollution by any breedout during drying of the web. If the aliphatic diol has an average number of carbon atoms of 2.5 or larger, the polycondensed ester will have a good compatibility, and will be less likely to deposit.

More specifically, when the polycondensed ester contains the aliphatic dicarboxylic acid residue, it preferably contains succinic acid residue or adipic acid residue, and more preferably contains succinic acid residue.

The polycondensed ester may contain only a single species of the aliphatic dicarboxylic acid residue, or two or more species thereof. For the case where two or more species of the aliphatic dicarboxylic acid residues are contained in the polycondensed ester, it is preferable that succinic acid residue and adipic acid residue are contained. Meanwhile for the case where only a single species of aliphatic dicarboxylic acid residue is contained in the polycondensed ester, it is preferable that succinic acid residue is contained. With such embodiment, the average number of carbon atoms of diol residue may be controlled within a preferable range, and thereby the compatibility with the cellulose acylate may be improved.

For the polycondensed ester, usable as the diol residue are aromatic diol residue and aliphatic diol residue.

The polycondensed ester used in this invention contains, as the diol residue, at least one species of aliphatic diol residue.

The aliphatic diol used for this invention is exemplified by alkyldiols and alicyclic diols, and more specifically by ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol, and cyclohexanedimethanol. A single species, or two or more species, of these compounds are preferably used in combination with ethylene glycol.

Among them, in this invention, the polycondensed ester preferably contains 30% by mole or more, relative to the total diol residues, of aliphatic diol residue having three or more carbon atoms (also referred to as ratio of aliphatic diol having three or more carbon atoms, hereinafter), from the viewpoint of improvement in the compatibility between the cellulose acylate and the polycondensed ester, and improvement in the solubility of the polycondensed ester into solvent.

The ratio of aliphatic diol having three or more carbon atoms is more preferably 30% by mole or above, and particularly 50 to 80% by mole.

The aliphatic diol residue having 3 or more carbon atoms is exemplified by 1,2-propanediol residue, 1,3-propanediol residue, 1,2-butanediol residue, 1,3-butanediol residue, 2-methyl-1,3-propanediol residue, 1,4-butanediol residue, 1,5-pentanediol residue, 2,2-dimethyl-1,3-propanediol (neopentyl glycol) residue, 1,4-hexanediol residue, and 1,4-cyclohexanediol residue. Among them, the aliphatic diol residue having 3 or more carbon atoms preferably used in this invention is at least one species selected from 1,2-propanediol residue, 1,3-propanediol residue, 1,2-butanediol residue, 1,3-butanediol residue, 2-methyl-1,3-propanediol residue, 1,4-butanediol residue, 1,5-pentanediol residue, and 2,2-dimethyl-1,3-propanediol (neopentyl glycol) residue; and is more preferably at least one species selected from 1,2-propanediol residue, 1,3-propanediol residue, 1,2-butanediol, 1,3-butanediol residue, 2-methyl-1,3-propanediol residue and 1,4-butanediol residue; and is particularly 1,2-propanediol residue.

By using 1,2-propanediol residue or 1,3-propanediol residue, the polycondensed ester may be prevented from crystallizing.

When the aliphatic diol residue is used as the diol residue other than the aliphatic diol having 3 or more carbon atoms, ethylene glycol residue is typically usable.

The polycondensed ester will have formed therein the aliphatic diol residue which is derived from the aliphatic diol used as mixed.

The polycondensed ester may contain an aromatic diol residue as the diol residue, besides the aliphatic diol residue.

The aromatic diol residue is specifically exemplified by bisphenol-A residue, 1,2-hydroxybenzene residue, 1,3-hydroxybenzene residue, 1,4-hydroxybenzene residue, and 1,4-benzenedimethanol residue.

The polycondensed ester may contain only a single species of the aliphatic diol residue, or two or more species thereof. For the case where two or more species of the aliphatic diol residues are contained in the polycondensed ester, it is preferable that 1,2-propanediol residue and ethylene glycol residue are contained.

The polycondensed ester will have formed therein the aromatic diol residue which is derived from the aromatic diol used as mixed.

The terminals of the polycondensed ester may be left unblocked, in the form of —OH group derived from the diol, or in the form of —COOH group derived from the dicarboxylic acid; or may be allowed to react with any of monocarboxylic acid compounds or monoalcohol compounds for so-called terminal blocking, to thereby form —O—C(=O)—R$^1$ group, —C(=O)—O—R$^2$ group or —O—R$^3$ group (where each of R$^1$ to R$^3$ independently represents an aliphatic group).

When both terminals of the polycondensed ester are left unblocked, both terminals more preferably have —OH groups rather than —COOH groups, from the viewpoint of suppressing hydrolysis of the ester group. In other words, the polycondensed ester having both terminals left unblocked is preferably a polyester polyol.

Both terminals of the polycondensed ester, when blocked at both terminals, are preferably in the form of —O—C(=O)—R$^1$ group, —C(=O)—O—R$^2$ group or —O—R$^3$ group. Both terminals are more preferably in the form of —O—C(=O)—R$^1$ group. In other words, the polycondensed ester is preferably blocked at both terminals by allowing them to react with an aliphatic monocarboxylic acid.

The polycondensed ester in this case has aliphatic monocarboxylic acid residues at both terminals.

Now, each of R$^1$ to R$^3$ independently represents an aliphatic group. The aliphatic group represented by R$^1$ to R$^3$ may be any group having no aromatic ring, and may be either saturated or unsaturated. Again, the aliphatic group represented by R$^1$ to R$^3$ may be either chain-like aliphatic group or cyclic aliphatic group (cycloalkyl groups, for example), and the chain-like aliphatic group may be either straight chain-like or branched. The aliphatic group represented by R$^1$ to R$^3$ may further have a substituent without departing from the spirit of this invention. While the substituent is not specifically limited so long as it does not contain an aromatic ring, the aliphatic group preferably does not have such substituent. The aliphatic group represented by R$^1$ to R$^3$ preferably has 1 to 21 carbon atoms, more preferably 1 to 5 carbon atoms, particularly 1 to 3 carbon atoms, more particularly 1 or 2 carbon atoms, and most preferably one carbon atom.

Among them, the aliphatic group represented by R$^1$ to R$^3$ is preferably a chain-like saturated aliphatic group, more preferably a chain-like alkyl group, and particularly a straight-chain alkyl group.

In other words, when both terminals of the polycondensed ester are blocked, each of such both terminals of the polycondensed ester is preferably configured by an acyl group having 2 to 22 carbon atoms, more preferably an acyl group having 2 to 6 carbon atoms, particularly an acyl group having 2 to 4 carbon atoms (i.e., acetyl group, propionyl group or butyryl group), more particularly an acyl group having 2 or 3 carbon atoms (i.e., acetyl group or propionyl group), and most preferably an acyl group having two carbon atoms (i.e., acetyl group). Now, the acyl group in this context includes not only aliphatic acyl group, but also aromatic acyl group (so-called aloyl group), where the aliphatic acyl group is preferable. By limiting the number of carbon atoms of the acyl group at both terminals of the polycondensed ester to 3 or less, the polycondensed ester will have a reduced volatility, will not cause large heating loss, and thereby occurrence of process pollution or surface failure may be reduced.

The monocarboxylic acid compounds used here for blocking the terminals are preferably aliphatic monocarboxylic acids having 2 to 22 carbon atoms, more preferably aliphatic monocarboxylic acids having 2 to 6 carbon atoms, particularly aliphatic monocarboxylic acids having 2 to 4 carbon atoms, more particularly aliphatic monocarboxylic acid having 2 or 3 carbon atoms, and most preferably aliphatic monocarboxylic acid residue having two carbon atoms.

Both terminals of the polycondensed ester, when blocked at both terminals, may also be in the form of —C(=O)—O—R$^2$ group or —O—R$^3$ group.

In this case, the monoalcohol compounds used for blocking are preferably methanol, ethanol, propanol, isopropanol, butanol, and isobutanol. Methanol is most preferable.

It is more preferable from the viewpoint of controlling compatibility with the cellulose acylate, that each of both terminals of the polycondensed ester is independently in the form of —OH group or —O—C(=O)—R$^1$ group (where, if there are a plurality of (R$^1$)s, each of them independently represents an aliphatic group). While both terminals may be configured by the same group or different groups, they are preferably configured by the same group from the viewpoint of simplicity in synthesis.

Both terminals of the polycondensed ester are furthermore preferably in the form of —OH group, or may be blocked by acetic acid or propionic acid.

Both terminals of the polycondensed ester are preferably blocked by acetic acid to thereby given in the form of acetyl ester residues (occasionally referred to as acetyl residue), from the viewpoints that the polycondensed ester will be less likely to solidify at normal temperature, that the cellulose acylate film will be more easy to handle, and that the cellulose acylate film capable of ensuring good moisture stability and good durability of polarizing plate will be obtained.

The polycondensed ester preferably has a number-average molecular weight of 500 to 2000, more preferably 700 to 1500, and particularly 700 to 1200. The polycondensed ester preferably has a number-average molecular weight of 500 or larger, from the viewpoint of improving developability of optical performances. Meanwhile, if the number-average molecular weight is 2000 or less, the polycondensed ester will have an improved compatibility with the cellulose acylate, and thereby the resultant cellulose acylate film will be unlikely to cause breedout of the polycondensed ester during manufacture and hot stretching of the film.

The number-average molecular weight of the polycondensed ester may be measured and evaluated by gel permeation chromatography. For the polyester polyol having unblocked terminals, the number-average molecular weight may also be calculated based on the amount of hydroxy group per weight (referred to as hydroxy value). The hydroxy value is determined by acylating polyester polyol, and then measuring the amount (mg) of potassium hydroxide necessary for neutralizing the excessive acetic acid.

In this invention, the polycondensed ester may be used as a plasticizer.

Specific examples of the polycondensed ester usable here include a polycondensed ester configured by a carboxylic acid unit composed of terephthalic acid/adipic acid=50/50, a diol unit composition of ethylene glycol, terminated by acetyl groups, and having a molecular weight of 1500; and a polycondensed ester configured by a dicarboxylic acid unit composed of terephthalic acid/adipic acid=70/30, a diol unit composed of ethylene glycol/propylene glycol=50/50, terminated by acetyl groups, and having a molecular weight of 1800.

When the optical film of this invention contains the ester-base compound, the content of such ester-base compound is preferably 0.1 to 30% by mass relative to the mass of the cellulose acylate, more preferably 0.5 to 20% by mass, and furthermore preferably 1 to 20% by mass.

(Nitrogen-Containing Compound)

The optical film of this invention may also contain a nitrogen-containing compound as the optical performance developer. As the nitrogen-containing compound, usable are any of monocyclic compounds represented for example by Formula (1) and Formula (2). From the viewpoint of further improving developability of optical performances per unit thickness of the film, improving moisture dependence, and optical stability under moisture and heat, the optical film of this invention preferably contains a monocyclic compound represented by Formula (1) and/or a monocyclic compound represented by Formula (2) below.

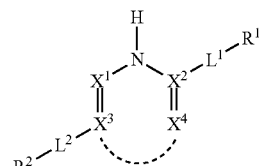

Formula (1)

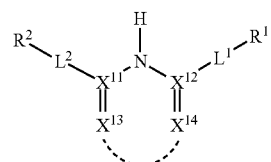

Formula (2)

In the formulae, each of $X^1$ and $X^4$ independently represents =CH— or nitrogen atom, each of $X^2$ and $X^3$ represents a carbon atom;

Each of $X^{11}$ and $X^{12}$ represents a carbon atom, each of $X^{13}$ and $X^{14}$ independently represents =CH— or nitrogen atom; each of $L^1$ and $L^2$ independently represents a single bond, —CO—, —O—, —NR—, or any group formed by combining any of them, where R represents a hydrogen atom, or an alkyl group having 1 to 6 carbon atoms; each of $R^1$ and $R^2$ independently represents an optionally-substituted cycloalkyl group having 5 to 10 carbon atoms, optionally-substituted aryl group having 6 to 20 carbon atoms, or optionally-substituted heterocyclic group having 3 to 10 carbon atoms; and each dotted line represents a single bond, or an atomic group capable of forming a ring together with —$X^3$(-$L^2$-$R^2$)=$X^1$—NH—$X^2$(-$L^1$-$R^1$)=$X^4$— or —$X^{13}$=$X^{11}$(-$L^2$-$R^2$)—NH—$X^{12}$(-$L^1$-$R^1$)=$X^{14}$—.

In Formula (1), each of $X^1$ and $X^4$ independently represents =CH— or nitrogen atom, and each of $X^2$ and $X^3$ represents a carbon atom.

In Formula (1), each of $L^1$ and $L^2$ independently represents a single bond, —CO—, —O—, —NR—, or groups formed by combining any of them, wherein a group formed by combining a single bond, —CO— and —O—, and a group formed by combining —CO— and —NR— are preferable, and both of $L^1$ and $L^2$ are more preferably single bonds.

R represents a hydrogen atom, or alkyl group having 1 to 6 carbon atoms. The alkyl group having 1 to 6 carbon atoms is preferably an alkyl group having 1 to 4 carbon atoms, and more preferably an alkyl group having 1 to 3 carbon atoms. The alkyl group having 1 to 6 carbon atoms is exemplified by methyl group, ethyl group, propyl group, isopropyl group, butyl group, t-butyl group, pentyl group, neopentyl group, hexyl group, and cyclohexyl group. R preferably represents a hydrogen atom.

In Formula (1), each of $R^1$ and $R^2$ independently represents an optionally-substituted cycloalkyl group having 5 to 10 carbon atoms, optionally-substituted aryl group having 6 to 20 carbon atoms, or optionally-substituted heterocyclic group having 3 to 10 carbon atoms.

The optionally-substituted cycloalkyl group having 5 to 10 carbon atoms is preferably cycloalkyl group having 5 to 8 carbon atoms, and more preferably cycloalkyl group having 5 or 6 carbon atoms. The cycloalkyl group having 5 to 10 carbon atoms is exemplified by cyclopentyl group, cyclohexyl group, cycloheptyl group, cyclooctyl group, cyclononyl group, and cyclodecyl group.

The optionally-substituted aryl group having 6 to 20 carbon atoms is preferably aryl group having 6 to 14 carbon atoms, and more preferably aryl group having 6 to 10 carbon atoms. The aryl group having 6 to 20 carbon atoms is exemplified by phenyl group, naphthyl group, and anthracenyl group.

When the aryl group has plural rings, the carbon number is preferably 9 to 18. An aryl group having a carbon number of 11 to 16 is more preferred. It is preferred that hetero ring is contained as a part of the plural rings.

The optionally-substituted heterocyclic group having 3 to 10 carbon atoms is preferably heterocyclic group having 3 to 7 carbon atoms, and is more preferably heterocyclic group having 3 to 5 carbon atoms. The heterocyclic group having 3 to 10 carbon atoms preferably has aromaticity. Heterocycle having aromaticity is generally unsaturated heterocycle, and is preferably heterocycle having a largest possible number of heterocycle. The heterocycle is preferably five-membered ring, six-membered ring or seven-membered ring, more preferably five-membered ring or six-membered ring, and most preferably six-membered ring. Hetero atom in the heterocycle is preferably nitrogen atom, sulfur atom or oxygen atom, and particularly nitrogen atom. As the heterocycle having aromaticity, pyridine ring (2-pyridyl or 4-pyridyl, when referred to as a heterocyclic group) is particularly preferable.

The cycloalkyl group having 5 to 10 carbon atoms, the aryl group having 6 to 20 carbon atoms, and the heterocyclic group having 3 to 10 carbon atoms may have a substituent. Examples of the substituent include halogen atom, hydroxyl group, cyano group, nitro group, carboxyl group, alkyl group (methyl group, ethyl group, propyl group, butyl group, pentyl group, etc.), alkenyl group, aryl group, alkoxy group (methoxy group, ethoxy group, propoxy group, butoxy group, etc.), alkenyloxy group, aryloxy group, acyloxy group, alkoxycarbonyl group, alkenyloxycarbonyl group, aryloxycarbonyl group, sulfamoyl group, alkyl-substituted sulfamoyl group, alkenyl-substituted sulfamoyl group, aryl-substituted sulfamoyl group, sulfonamide group, carbamoyl, alkyl-substituted carbamoyl group, alkenyl-substituted carbamoyl group, aryl-substituted carbamoyl group, amide group, alkylthio group, alkenylthio group, arylthio group, 2-thiophenyl group, 2-pyrrolyl group and acyl group.

In Formula (1), the dotted line indicates a single bond, or an atomic group which forms a ring together with —$X^3$(-$L^2$-$R^2$)=$X^1$—NH—$X^2$(-$L^1$-$R^1$)=$X^4$—.

The atomic group is exemplified by —$CH_2$—, —NH—, —CH(-$L^1$-$R^1$)— (in the formula, $L^1$ and $R^1$ are synonymous to those described above, with the same preferable ranges), and groups formed by combining any of them, wherein single bond or —$CH_2$— is preferable, and single bond is more preferable.

The atomic group is preferably configured so as to give the compound represented by Formula (1) as a five- to seven-membered ring, more preferably configured to form a five-membered ring or six-membered ring, and furthermore preferably configured to form a five-membered ring. The five-membered ring is exemplified by pyrrole ring, pyrazole ring, imidazole ring and triazole ring.

In Formula (2), each of $X^{11}$ and $X^{12}$ represents a carbon atom, and each of $X^{13}$ and $X^{14}$ independently represents =CH— or nitrogen atom.

In Formula (2), each of $L^1$ and $L^2$ independently represents a single bond, —CO—, —O—, —NR—, and groups formed by combining any of them, which are synonymous to $L^1$ and $L^2$ in Formula (1), and to R, with the same preferable ranges.

In Formula (2), each of $R^1$ and $R^2$ independently represents an optionally-substituted cycloalkyl group having 5 to 10 carbon atoms, optionally-substituted aryl group having 6 to 20 carbon atoms, or optionally-substituted heterocyclic group having 3 to 10 carbon atoms, which are synonymous to $R^1$ and $R^2$ in Formula (1), with the same preferable ranges.

In Formula (2), the dotted line indicates a single bond, or an atomic group capable of forming a ring together with —$X^{13}$=$X^{11}$(-$L^2$-$R^2$)—NH—$X^{12}$(-$L^1$-$R^1$)=$X^{14}$—.

Definition of the atomic group is synonymous to that of the dotted line in Formula (1), with the same preferable ranges.

The atomic group is preferably configured so as to give the compound represented by Formula (2) as a five- to seven-membered ring, more preferably configured to form a five-membered ring or six-membered ring, and furthermore preferably configured to form a five-membered ring. The five-membered ring is exemplified by pyrrole ring, pyrazole ring, imidazole ring and triazole ring.

The monocyclic compound represented by Formula (1) and monocyclic compound represented by Formula (2) are preferably a monocyclic compound represented by Formula (1-1) below and a monocyclic compound represented by Formula (2-1) below, respectively

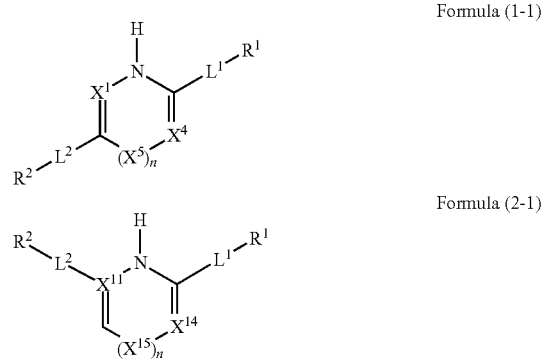

Formula (1-1)

Formula (2-1)

In the formulae, each of $X^1$ and $X^4$ independently represents =CH— or nitrogen atom, $X^5$ represents —$CH_2$— or —NH—, $X^{11}$ represents a carbon atom, $X^{14}$ represents =CH— or nitrogen atom, $X^{15}$ represents —$CH_2$— or —NH—, each of $L^1$ and $L^2$ independently represents a single bond, —CO—O—, —CO—NH—, or —NH—CO—, each of $R^1$ and $R^2$ independently represents an optionally-substituted cycloalkyl group having 5 to 10 carbon atoms, optionally-substituted aryl group having 6 to 20 carbon atoms, or optionally-substituted heterocyclic group having 3 to 10 carbon atoms, and n represents an integer of 0 or 1.

In Formula (1-1) and Formula (2-1), each of $L^1$ and $L^2$ independently represents a single bond, —CO—O—, —CO—NH—, or —NH—CO—, and particularly a single bond.

In Formula (1-1) and Formula (2-1), each of $R^1$ and $R^2$ independently represents an optionally-substituted cycloalkyl group having 5 to 10 carbon atoms, optionally-substituted aryl group having 6 to 20 carbon atoms, or optionally-substituted heterocyclic group having 3 to 10 carbon atoms, and are synonymous to $R^1$ and $R^2$ in Formula (1), with the same preferable ranges.

In Formula (1-1) and Formula (2-1), n represents an integer of 0 or 1, where 0 is preferable.

Specific examples of the monocyclic compound represented by Formula (1) and the monocyclic compound represented by Formula (2) are enumerated below, without limiting this invention. In the formulae, each of Ar¹ and Ar² independently represents an optionally-substituted cycloalkyl group having 5 to 10 carbon atoms, optionally-substituted aryl group having 6 to 20 carbon atoms, or optionally-substituted heterocyclic group having 3 to 10 carbon atoms.

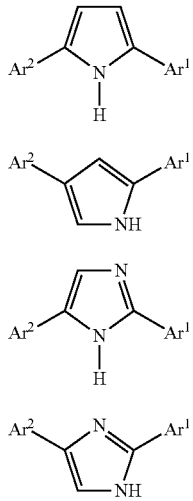

Compound 1

Compound 2

Compound 3

Compound 4

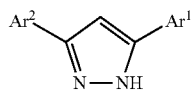

Compound 5

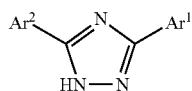

Compound 6

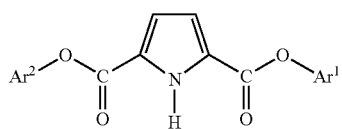

Compound 7

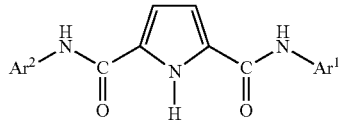

Compound 8

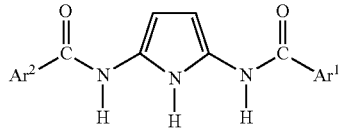

Compound 9

TABLE 1

| | Cyclic skeleton containing formula (1-1) or (2-1) | Ar¹ | Ar² |
|---|---|---|---|
| Compound 1-a | Compound 1 | Phenyl group | Phenyl group |
| Compound 2-a | Compound 2 | Phenyl group | Phenyl group |
| Compound 3-a | Compound 3 | Phenyl group | Phenyl group |
| Compound 4-a | Compound 4 | Phenyl group | Phenyl group |
| Compound 5-a | Compound 5 | Phenyl group | Phenyl group |
| Compound 6-a | Compound 6 | Phenyl group | Phenyl group |
| Compound 7-a | Compound 7 | Phenyl group | Phenyl group |
| Compound 8-a | Compound 8 | Phenyl group | Phenyl group |
| Compound 9-a | Compound 9 | Phenyl group | Phenyl group |
| Compound 1-b | Compound 1 | 4-Butoxyphenyl group | 4-Butoxyphenyl group |
| Compound 6-b | Compound 6 | 4-Butoxyphenyl group | 4-Butoxyphenyl group |
| Compound 1-c | Compound 1 | 4-Pentylphenyl group | 4-Pentylphenyl group |
| Compound 6-c | Compound 6 | 4-Pentylphenyl group | 4-Pentylphenyl group |
| Compound 8-c | Compound 8 | 4-Pentylphenyl group | 4-Pentylphenyl group |
| Compound 1-d | Compound 1 | 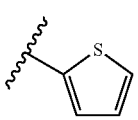 [SMILES: *c1cccs1] | 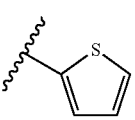 [SMILES: *c1cccs1] |
| Compound 1-e | Compound 1 | 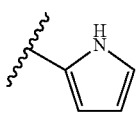 | 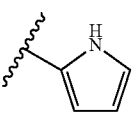 [SMILES: *c1ccc[nH]1] |

TABLE 1-continued

| | Cyclic skeleton containing formula (1-1) or (2-1) | Ar¹ | Ar² |
|---|---|---|---|
| Compound 5-b | Compound 5 | Phenyl group | 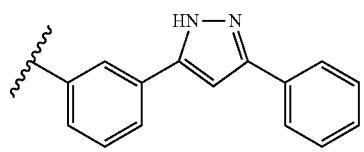 [SMILES: *c1cccc(-c2cc(-c3ccccc3)n[nH]2)c1] |

The monocyclic compound represented by Formula (1) and the monocyclic compound represented by Formula (2) may be synthesized according to, for example, methods described in literatures below.

Compound 1-a may be synthesized according to a synthetic method described in *J. Chem. Soc., Perkin Trans.*, 1, 1997, 3189-3196.

Compound 3-a may be synthesized according to a synthetic method described in *J. Am. Chem. Soc.*, 2003, 125, 10580-10585.

Compound 6-a may be synthesized according to a synthetic method described in *Bioorganic & Medicinal Chemistry*, 2010, 18, 6184-6196.

As the nitrogen-containing compound, any compounds other than the monocyclic compound represented by Formula (1) or Formula (2) below may be used. More specifically, such compound usable here has any one of pyridine, pyrimidine and purine as a scaffold, and has, as a substituent at any substitutable position on the scaffold, an alkyl group, alkenyl group, alkynyl group, amino group, amide group (this means a structure such that an arbitrary acyl group is bound via an amide bond), aryl group, alkoxy group, thioalkoxy group, alkyl or arylthio group (a group such that an alkyl group or aryl group is bound via a sulfur atom), or heterocyclic group. Note that the substituent on the scaffold of these nitrogen-containing aromatic compound-base plasticizer may be substituted by still other substituent which is not specifically limited. For an exemplary case where the scaffold is substituted by an amino group, the amino group may further be substituted by an alkyl group (even the alkyl groups may mutually bind to each other to form a ring) or —SO₂R' (R' represents an arbitrary substituent). Specific examples of such nitrogen-containing compound are exemplified by those described in paragraphs [0081] to [0087] of JP-A-2013-139541, the contents of which are incorporated into this invention. For example, also the compound below may be used.

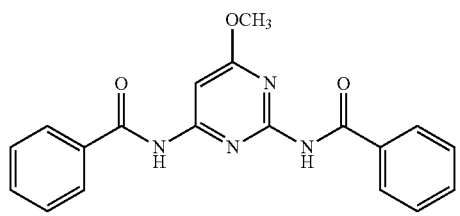 [SMILES: COc1cc(NC(=O)c2ccccc2)nc(NC(=O)c2ccccc2)n1]

The content of the nitrogen-containing compound is preferably 1 to 10 parts by mass, more preferably 1 to 7 parts by mass, and furthermore preferably 2 to 5 parts by mass, per 100 parts by mass of cellulose acylate. The nitrogen-containing compound may be used independently, or as a mixture of two or more species. When two or more species are mixed, the total amount falls in the above-described ranges.

In this invention, as the optical performance developer, two or more species selected from sugar ester compound, ester-base compound, and nitrogen-containing compound may be used in combination. When two or more species selected from sugar ester compound, ester-base compound, and nitrogen-containing compound are used in combination, the contents of the individual compounds are not specifically limited so long as they fall in the ranges described in this specification respectively for the compounds. It is preferable to combine at least one species selected from sugar ester compound and ester-base compound, with at least one species of nitrogen-containing compound. While the ratio of the sugar ester compound or ester-base compound, and the nitrogen-containing compound, when used in combination, is not specifically limited, it is preferable to add 1.5 to 10 parts by mass of sugar ester compound or ester-base compound relative to 1 part by mass of nitrogen-containing compound, and is more preferable to add 2 to 8 parts by mass of sugar ester compound or ester-base compound relative to 1 part by mass of nitrogen-containing compound.

(Matting Agent)

The optical film of this invention preferably contains a particle as a matting agent. The particle usable in this invention is exemplified by those composed of silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate and calcium phosphate. The particle preferably contains silicon in view of reducing turbidity. Silicon dioxide is particularly preferable. Silicon dioxide particle is commercially available as, for example, Aerosil R972 (from Nippon Aerosil Co., Ltd.). The silicon dioxide particle preferably has a primary average particle size of 20 nm or less, and an apparent specific gravity of 70 g/L or more. Primary particle having an average diameter of as small as 5 to 16 nm is more preferable since the film will have a reduced haze. The apparent specific gravity is preferably 90 to 200 g/L, and more preferably 100 to 200 g/L. The larger the apparent specific gravity, the higher the concentration of dispersion liquid may be made, which advantageously improves the haze and aggregation. A preferable embodiment is detailed in Journal of Technical Disclosure No. 2001-1745, published on May 15, 2001 by Japan Institute of Invention and Innovation, p. 35-36, and is suitably applicable to the optical film of this invention. The amount of mixing of matting agent is preferably 0.01 to 0.30% by mass relative to cellulose acylate, and more preferably 0.05 to 0.20% by mass relative to cellulose acylate.

<Method of Manufacturing Optical Film>

The optical film of this invention may be manufactured by solvent casting. In the solvent casting, the cellulose acylate is dissolved into an organic solvent to prepare a dope. Also the optical performance developer may be added to the dope. Exemplary combinations of organic solvents which are suitably used as the solvent for polymer solution in this invention are enumerated in JP-A-2009-262551.

The optical performance developer may be added together with the cellulose acylate to prepare the dope, or may be prepared once in the form of solution separately from the cellulose acylate, and then the solution of the optical performance developer may be added to the cellulose acylate to prepare the dope. The optical film is manufactured by casting the dope over a support (band) typically made of metal, followed by drying. The film is then peeled off from the support, and then stretched. The optical film of this invention is thus manufactured.

The optical film of this invention has different levels of content of mannose and optical performance developer between the front surface and back surface (region A, region B) of the film, showing a thicknesswise distribution. The thicknesswise distribution of the contents of mannose and optical performance developer may be controlled by suitably controlling drying conditions in the process of manufacturing and drying of the film on the metal support. The relation between the content of optical performance developer between the region A and the region B of the film may be controlled more suitably according to species of the optical performance developer, species of the cellulose acylate, and solvent to be used.

In the process of drying on the band, the solvent vaporizes from the air interface side, thereby the solvent distribution occurs in the thicknesswise direction. In other words, the side faced to the support becomes relatively solvent-rich and cellulose acylate-poor. Meanwhile, the air interface becomes relatively solvent-poor and cellulose acylate-rich. If the optical performance developer has a solubility in the solvent which is larger than the solubility in the cellulose acylate, the optical performance developer tends to be condensed towards the side faced to the support.

In the process of drying on the band, the drying air temperature is preferably 30 to 80° C., more preferably 40 to 70° C., and furthermore preferably 40 to 60° C.

By controlling the drying air temperature to 30° C. or higher, the distribution of optical performance developer will be increased, meanwhile by controlling it to 80° C. or lower, the film may be prevented from foaming during drying.

The temperature of the band is preferably 5 to 30° C., more preferably 10 to 25° C., and furthermore preferably 10 to 20° C.

By controlling the temperature of the band within the above-described ranges, the speed of migration of solvent from the side faced to the support towards the air interface side may decrease, so that the thicknesswise distribution of solvent will be increased, and thereby the thicknesswise distribution of the optical performance developer will be increased.

Exemplary manufacture of cellulose acylate film based on solvent casting may be referred to descriptions in U.S. Pat. No. 2,336,310, U.S. Pat. No. 2,367,603, U.S. Pat. No. 2,492,078, U.S. Pat. No. 2,492,977, U.S. Pat. No. 2,492,978, U.S. Pat. No. 2,607,704, U.S. Pat. No. 2,739,069, U.S. Pat. No. 2,739,070, British Patent No. 640731, British Patent No. 736892, JP-B-S45-4554, JP-B-S49-5614, JP-A-S60-176834, JP-A-S60-203430 and JP-A-S62-115035.

After the manufacture, the film is preferably stretched. The factor of stretching is preferably 3 to 100% or around. The film may be stretched using a tenter, or longitudinally stretched between rolls.

Methods and conditions of stretching may be referred, for example, to exemplary cases described in JP-A-S62-115035, JP-A-H04-152125, JP-A-H04-284211, JP-A-H04-298310, and JP-A-H11-48271.

The optical film of the present invention can be biaxially stretched.

When biaxial stretching is carried out, it is preferred that the film is stretched in MD direction (feed direction), and then is stretched in TD direction (a direction which is orthogonal to feed direction). When the film is stretched, the film may contain a residual solvent, or the film which does not contain a residual solvent may be stretched. When the film contains a residual solvent, it is preferred that the film is stretched in a state where the solvent amount is 0.1% by weight to 50% by weight to the film solid weight.

The factor of stretching in MD direction of the film is preferably 0 to 70%, and is more preferably 0 to 60%, and is particularly preferably 0 to 50%. The aforementioned factor of stretching can be achieved by making the differences of the film feed speed at the inlet of the stretching zone and the film feed speed at the outlet of the stretching zone. For example, when a device having two nip rolls is used, a cellulose acylate film can be preferably stretched in MD direction by making the rotation speed of nip roll at the outlet faster than the rotation speed of nip roll at the inlet of the stretching zone. The factor of stretching (%) used herein is defined by the following formula.

The factor of stretching (%)=100×[(length after stretching)−(length before stretching)]/length before stretching The factor of stretching in the stretching in the film TD direction is preferably larger than 20%, and is more preferably larger than 20% and 60% or less, and is particularly preferably 22 to 55%, and is further particularly preferably 23 to 50%.

The film surface temperature at the time of initiation of stretching is preferably 100° C. to 220° C., and is more preferably 120° C. to 200° C.

In the present invention, it is preferred to carry out stretching by using a tenter device as a method for stretching a film in TD direction.

Desired Re and Rth can be achieved by controlling the factor of stretching in MD direction, the residual solvent amount at the time of stretching, the stretching temperature, the factor of stretching in TD direction, the residual solvent amount at the time of stretching, and the stretching temperature.

[Polarizing Plate]

This invention also relates to a polarizing plate which comprises the optical film of this invention and a polarizer. The optical film of this invention has different levels of content of optical performance developer on the top side and back side thereof (region A, region B). Whichever side of the region A and the region B may be bonded to the polarizer.

The polarizer is preferably a coating-type polarizer typically manufactured by Optiva Inc., or a polarizer composed of a binder, iodine or a dichroic dye. Iodine and the dichroic dye in the polarizer exhibit their polarizing performances through alignment in the binder. Iodine and dichroic dye preferably align with the binder molecule, or the dichroic dye preferably aligns unidirectionally through self-organization such as shown by liquid crystal. At present, commercially available polarizers are generally manufactured by immersing a stretched polymer into a solution bath containing iodine or the dichroic dye, and allowing iodine or the dichroic dye to impregnate into the binder.

The thickness of the polarizer is not particularly limited, but is preferably 5 to 15 μm in view of suppressing wavy curl of the polarizing plate.

On the surface of the polarizer opposite to the surface having the optical film bonded thereto, a protective film is preferably arranged. In other words, a possible arrangement is such as the optical film of this invention/polarizer/protective film. It is also preferable for the protective film to be provided, on the topmost surface thereof, with an anti-reflection film having anti-fouling and scratch-proofing performances. The anti-reflection film useable here may be any of those well known.

(Wavy Curl)

The wavy curl means a phenomenon where a polarizing plate obtained by laminating a protect film, a protective film, a polarizer, a optical film, an adherent, and a separate film in this order is deformed to be wave-like shape due to wet expansion of the edge of the polarizing plate as a result that the edge of the polarizing plate adsorbs water when placed under an environment of high humidity.

It was revealed that the wavy curl of the polarizing plate can be suppressed when the thickness of the polarizer is 5 to 15 μm and a biaxially stretched optical film is used. Although its mechanism has not been revealed, it is assumed that the expansion is suppressed when the thickness of the polarizer is 5 to 15 μm, and the optical film functions to suppress the expansion of polarizer when a biaxially stretched optical film is used.

[Liquid Crystal Display Device]

This invention also relates to a liquid crystal display device having the optical film of this invention, or the polarizing plate of this invention. An exemplary liquid crystal display device of this invention has at least one polarizing plate of this invention. The optical film of this invention is expected to improve display characteristics of liquid crystal display device of various modes based on a new optical compensation action, without being limited by the mode. The optical film will supposedly improve the display characteristics of liquid crystal display device of various modes which include TN (Twisted Nematic), IPS (In-Plane Switching), OCB (Optically Compensatory Bend), VA (Vertically Aligned), and ECB (Electrically Controlled Birefringence) modes, based on a new optical compensation action. In particular, the optical film is preferably used for optical compensation of liquid crystal display devices of vertically aligned mode and horizontally aligned mode.

The liquid crystal display device of this invention includes a liquid crystal cell held between a pair of polarizing plates, and the polarizing plate includes an optical film, a polarizer, and a protective film which are arranged in this order from the side of the liquid crystal cell. Since the optical film is used for each of two polarizing plates, so that at least two optical films are used. In the liquid crystal display device of this invention, it suffices that at least one of the optical films is configured by the optical film of this invention, wherein it is preferable that both of two optical films, used respectively for two polarizing plates, are configured by the optical film of this invention. The liquid crystal cell preferably shows a degree of depolarization of 0.02% or less when observed from the front, more preferably 0.015% or less, and furthermore preferably 0.01% or less. With such configuration, the front contrast may be improved. The degree of depolarization may be measured typically by a method described below.

From a liquid crystal display of a commercially available liquid crystal display device, which incorporates a VA-mode liquid crystal cell, only a polarizing plate is peeled off and kept it alone. Next, single-side polarizing plates each having a protective film bonded only on one surface thereof are prepared, each polarizing film side thereof is then bonded to a glass plate, and are set on the upper side and lower side of the liquid crystal cell, so that the liquid crystal cell and the single-side polarizing plates with bonded glass plate are kept horizontally. Each of the single-side polarizing plate with bonded glass plate has a degree of polarization of 99.995%, and a degree of extinction of $5.0 \times 10^{-5}$. In order to avoid influence of phase difference of the protective film of the single side polarizing plate, each polarizing film surface is directed to the sample side. A spectral brightness meter SR-UL1R (from Topcon Technohouse Corporation) is disposed on the outer side of one single-side polarizing plate so as to be perpendicular to the liquid crystal cell, meanwhile a commercially available back light for liquid crystal display is disposed, as a diffusion light source, on the outer side of the other single-side polarizing plate.

An automatic rotation stage (SGSP-60YAW, from Sigmakoki Co., Ltd.) is used as an angle adjustor for the polarizing plate on the side of the brightness meter. First, a signal for displaying black image is fed to the liquid crystal cell, the upper and lower polarizing plates are disposed in the crossnicol arrangement, and the angle of one polarizing plate is further finely adjusted so as enable measurement of brightness at a minimum brightness. The measured value is referred to as T(c)min. Next, a signal for displaying black image is fed to the liquid crystal cell, the upper and lower polarizing plates are disposed in the parallel nicol arrangement, and the angle of one polarizing plate is further finely adjusted so as to enable measurement of brightness at a maximum brightness. The measured value is referred to as T(c)max.

Also a measurement is made for the single-side polarizing plates with bonded glass plates only, without holding the liquid crystal cell in between. The measured value of minimum brightness is referred to as T(p)min, and maximum brightness as T(p)max.

Using these results of measurement, DI value of the liquid crystal cell is calculated according to the equation below.

$$DI=2/[1+T(c)\max/T(c)\min]-2/[1+T(p)\max/T(p)\min]$$

EXAMPLES

Features of this invention will further be detailed referring to Examples and Comparative Examples. Materials, amounts of consumption, ratios, details of processes, and procedures of processes described in Examples below may be modified suitably, without departing from the spirit of this invention. The scope of this invention is therefore by no means interpreted limitatively by Examples described below.

<Cellulose Acylate>
<<Synthesis of Cellulose Acylate 1>>

The cellulose acylate was synthesized according to a method described in Example of JP-A-2008-56768, as described below.

A sheet-like cellulose (cotton linter pulp) containing 97% by mass of α-cellulose was processed using a disk refiner into flocculent cellulose. One hundred parts by mass of flocculent cellulose (moisture content=8.0% by mass) was sprayed with 47.16 parts by mass of acetic acid, stirred thoroughly, and allowed to stand still at 24° C. for 60 minutes (first activation step). To the cellulose after gone through the first activation step, acetic acid (30.28 parts by mass) containing sulfuric acid (0.94 parts by mass) was added, and the mixture was allowed to stand still at 24° C. for 60 minutes (second activation step).

To thus-activated cellulose after gone through the second activation step, acetic acid (417.85 parts by mass), acetic anhydride (282.98 parts by mass) and sulfuric acid (8.72 parts by mass) were mixed, the mixture was kept at 15° C. or below for 20 minutes, then the reaction system was heated at a heating rate of 0.31° C./min up to 35° C. and kept for 40 minutes for acetylation. The content was mixed with acetic acid (0.15 parts by mass), water (22.98 parts by mass) and magnesium acetate (7.30 parts by mass), kept at 61° C. for 95 minutes, and then added with magnesium acetate (7.48 parts by mass), acetic acid (20.94 parts by mass) and water (21.44 parts by mass) to terminate the aging reaction. The reaction liquid was then poured into dilute acetic acid under stirring, the product was allowed to precipitate, immersed in an aqueous dilute calcium hydroxide solution, and the precipitate was collected and dried, to thereby obtain cellulose acetate.

<<Washing of Cellulose Acylate>>

Cellulose acylate was crushed using a general crusher for cellulose acetate. One hundred parts by mass of the crushed cellulose was immersed into 3000 parts by mass water, and allowed to swell under stirring at room temperature for 90 minutes. The cellulose was dewatered on a Buchner funnel under suction using an aspirator, to obtain 530 parts by mass of moistened pulp (moistened cellulose). The obtained moistened pulp was immersed into 1500 parts by mass of methanol, and stirred at room temperature for 30 minutes. The pulp containing methanol was then deliquored on a Buchner funnel under suction using an aspirator, to obtain 450 parts by mass of a polar solvent-containing pulp. The polar solvent-containing pulp was immersed into 1500 parts by mass of acetone, and stirred at room temperature for 30 minutes. The acetone-containing pulp was then deliquored on a Buchner funnel under suction using an aspirator, to obtain 420 parts by mass of amphiphilic solvent-containing pulp.

The obtained amphiphilic solvent-containing pulp was immersed into 1500 parts by mass of n-hexane, and stirred for 120 minutes. The content was then deliquored on a Buchner funnel under suction using an aspirator. The obtained paraffinic hydrocarbon-containing pump was dried while being concomitantly crushed, to thereby obtain a crushed pulp with a reduced content of dichloromethane extract. The content of the dichloromethane extract after the extraction was 2.0 ppm.

<<Synthesis of Cellulose Acylate 2>>

Dissolving pulp (α-cellulose content=93% by mass) obtained by the kraft process is crushed in water, water was replaced with acetone, and dried. One hundred parts by mass of the pulp was uniformly sprayed with 500 parts by mass of acetic acid, and mixed at 40° C. for 30 minutes for pretreatment and activation.

The pulp was then added with a mixture of 250 parts by mass of acetic anhydride and 4.0 parts by mass of sulfuric acid, for esterification by general procedures. The content produced heat due to a reaction between water entrained with the source pulp and acetic anhydride, and a reaction between the cellulose and acetic anhydride, so that the temperature was controlled by external cooling. Next, 125 parts by mass of an organic solvent was added, and the mixture was allowed to proceed acetylation while keeping the temperature.

Next, the organic solvent used as the reaction solution was removed by heating, 35 parts by mass of a 20% aqueous calcium acetate solution was added and mixed so as to completely neutralize sulfuric acid in the system, and to make the system calcium acetate-excessive (1.09-fold equivalent of sulfuric acid).

The completely neutralized reaction mixture was kept at 150° C. for 50 minutes, and then kept under the atmosphere at 100° C. The reaction mixture, kept stirred, was then added with a dilute aqueous acetic acid solution, a resultant flaky acetyl cellulose was separated, thoroughly washed with water, taken out, and dried. The obtained flaky acetyl cellulose was found to have a degree of substitution with acetyl group of 2.4, a number-average molecular weight of 47500, and a weight-average molecular weight of 166000.

The obtained cellulose acylate was used in Comparative Examples 1 and 2 described later.

<<Synthesis of Cellulose Acylate 3>>

A cellulose acylate having a degree of acetyl substitution of 2.43 was prepared according to a method described in JP-A-H10-45804. To cellulose, sulfuric acid was added (7.8 parts by mass per 100 parts by mass of cellulose) as a catalyst, then the individual carboxylic acids were added, and an acylation reaction was allowed to proceed at 40° C. Thereafter, the total degree of substitution and the degree of substitution on the 6-position were controlled by controlling the amount of catalytic sulfuric acid, the amount of water, and aging time. The aging was allowed to proceed at 40° C. The cellulose acylate was further washed with acetone to thereby remove low-molecular-weight components.

The obtained cellulose acylate was used in Comparative Example 3 described later.

<Manufacture of Optical Film 1>

<<Preparation of Dope>>

The composition below was placed in a mixing tank, stirred to dissolve the individual components, further heated at 90° C. for approximately 10 minutes, and then filtered through filter paper with an average pore size of 34 μm, and then through a sintered metal filter with an average pore size of 10 μm.

| Cellulose Acylate Solution | |
|---|---|
| Cellulose acylate listed in Table below | 100.0 parts by mass |
| Optical performance developer 1 listed in Table below (sugar 1) | 13.0 parts by mass |
| Optical performance developer 2 listed in Table below (N2) | 2.5 parts by mass |
| Methylene chloride | 403.0 parts by mass |
| Methanol | 60.2 parts by mass |

Next, the composition below, which contains the cellulose acylate solution prepared by the method described above, was placed in a disperser, to prepare a matting agent dispersion.

| Matting Agent Dispersion | |
|---|---|
| Matting agent (Aerosil R972) (from Nippon Aerosil Co., Ltd.) | 0.2 parts by mass |
| Methylene chloride | 72.4 parts by mass |
| Methanol | 10.8 parts by mass |
| Cellulose Acylate Solution | 10.3 parts by mass |

A dope used for manufacture was prepared by mixing 100 parts by mass of the cellulose acylate solution, and the matting agent dispersion, where the amount of the matting agent dispersion was adjusted so that the inorganic particle accounts for 0.02 parts by mass relative to the total cellulose acylate (total amount of cellulose acylate contained in the cellulose acylate solution and in the matting agent dispersion).

<<Casting>>

The dope described above was cast using a band casting machine. The band was made of SUS.

<<Drying on Band>>

After cast over the band, drying air at 50° C. was blown at a speed of 8 m/min in the same direction with the film feed direction. Temperature of the band was kept at 15° C.

<<Drying after Peeled Off>>

A web (film) obtained by casting was peeled off from the band, and then dried for 20 minutes in a tenter machine which conveys the web while clipping both edges thereof using clips. The drying temperature in this context means the surface temperature of the film.

<<Stretching>>

The obtained web (film) was peeled off from the band, held by clips, and after conditioned to have a residual solvent content of 30% by mass relative to the total mass of the film, the film was stretched using a tenter under conditions of fixed-end, mono-axial stretching at a stretching temperature of 170° C. and a factor of stretching of 30%, in the direction perpendicular to the film feeding direction (transverse direction). In this process, the thickness of casting was controlled so as to adjust the thickness after stretching, to the values of thickness (in μm) summarized in Table.

The film was then taken up after cooled to room temperature. For the purpose of evaluating adequacy of the manufacturing, at least 24 rolls of 1280 mm width and 2600 mm long were manufactured under the conditions described above. One roll, out of 24 rolls manufactured successively, was cut to give 1 m-long samples (1280 mm wide) at 100 m intervals.

Examples 2 to 8

Optical films 2 to 8 were manufactured in the same way as Example 1, except that species and contents of the optical performance developer 1, species and contents of the optical performance developer 2, and the thickness were varied as summarized in Table below.

Example 9

A dope was prepared in the same method as Example 1, and was casted in a band casting machine, dried, and was peeled off from the band. After peeling off from the band, a film was dried, and was stretched in a direction (lateral direction) which is orthogonal to the film feed direction at a stretching temperature of 175° C. at a factor of stretching of 30% using a tenter in a condition of fixed edge and uniaxial stretching at the time when the residual solvent amount is 1% by mass. The obtained film is referred to as optical film 17.

Example 10

A dope was prepared in the same method as Example 1, and was casted in a band casting machine, dried, and was peeled off from the band. After peeling off from the band, a film was dried, and was stretched in the film MD direction at the time when the residual solvent amount is 5% by mass. The stretching temperature is 160° C., and the factor of stretching was 30%. Then, the film was stretched in a direction (lateral direction) which is orthogonal to the film feed direction at a stretching temperature of 175° C. at a factor of stretching of 60% using a tenter in a condition of fixed edge and uniaxial stretching at the time when the residual solvent amount is 1% by mass. The obtained film is referred to as optical film 18.

Comparative Examples 1 to 6

Optical films 9 to 14 were manufactured in the same way as Example 1, except that species of cellulose acylate, species and contents of the optical performance developer 1, species and contents of the optical performance developer 2, and the thickness were varied as summarized in Table below. The optical film of Comparative Example 6 could not be peeled off from the band (made of SUS), and could not be handled.

Comparative Example 7

An optical film 15 of Comparative Example 7 was manufactured in the same way as Example 1, except that the temperature of the band, during drying on the band, was set to 35° C.

Comparative Example 8

An optical film 16 of Comparative Example 8 was manufactured in the same way as Example 1, except that the temperature of dry air on the band was set to 130° C. The film could, however, not be evaluated due to foaming.

(Measurement of Mannose Content)

Two hundred milligrams of dried optical film was precisely weighed, added with 3 ml of 72% sulfuric acid, and the optical film was completely dissolved by sonication over 2 hours or more, under cooling on icy water. To the obtained solution, 39 ml of distilled water was added, the mixture was shaken thoroughly, refluxed under nitrogen gas flow at 110° C. for 3 hours, and then allowed to stand for 30 minutes. Next, 14 g of barium carbonate was added, and the mixture was neutralized by sonication under cooling on icy water. Thirty minutes after, additional 10 g of barium carbonate was added, the mixture was neutralized to pH5.5 to 6.5 or around, and then filtered. The filtrate was diluted 100-fold by mass with ultrapure water to prepare a sample. The sample was analyzed by chromatography under conditions below, to determine the mannose content.

High Performance Liquid Chromatography Apparatus (HPLC Model DX-AQ, from Dionex Corporation)
Detector: pulsed amperometry detector (gold electrode)
Column: CarboPac PA-1 (250×4 mm), from Dionex Corporation
Eluent: 2 mM NaOH
Flow rate: 1.0 ml/min
Post column: Model AMMS-II, from Dionex Corporation Both surfaces of the thus manufactured optical film were scraped with a cutting edge to a depth of 2 μm, and the thus sampled powders were analyzed according to the same method as the method of measuring mannose content, to thereby determine the mannose content in the powder. Assuming the mannose-rich side as region A, and the mannose-poor side as region B, $M_A$ and $M_B$ were determined. $M_A/M_B$ was summarized in Table below.

Both surfaces of the optical film were scraped in the same way as in the method of determining $M_A$ and $M_B$, to obtain sample powders. Contents of the optical performance developer contained in the powder sampled from the region A, and in the powder sampled from the region B were quantified as described below, to determine $C_A$ and $C_B$. $C_A/C_B$ was summarized in Table below.

The content of the optical performance developer, showing absorption in the UV region when dissolved in a solution, was calculated from the absorbance. Ten milligrams of the powder sampled from one surface of the optical film was dissolved in 50 ml of a dichloromethane/methanol=90/10 mixed solution, and the absorbance of the solution was measured using UV3150 (from Shimadzu Corporation). Also the other surface of the optical film was measured in the same way as the one surface.

If the content of optical performance developer is not measurable by the method described above, the content of optical performance developer was determined by HPLC (high-performance liquid chromatography) under conditions below:
Apparatus: High-performance liquid chromatography (HPLC, Agilent HP1100, from Agilent Technologies Inc.)
Column: Imtakt Cadenza CD-C18, 2.0×150 mm
Flow rate: 0.2 ml/min
Injection volume: 3 μl
(Optical Characteristics)

Re and Rth were measured at 550 nm according to method described above, using KOBRA 21ADH (Oji Scientific Instruments).
(Hv Value)

Assuming now the direction of the slow axis of the optical film as azimuth=0°, $Hv_{15}(0°)$ was defined as luminance observed through polarizing plates with perpendicularly arranged absorption axes, when light is incident in the direction given by polar angle=15° and azimuth=0°; and $Hv_{15}(90°)$ was defined as luminance observed through polarizing plates with perpendicularly arranged absorption axes, when light is incident in the direction given by polar angle=15° and azimuth=90°. Illuminance of the incident light was set to 10000 (1×s). The luminance is given in ×10$^{-2}$ cd/m$^2$.

(Optical Changes after Aged at 60° C., 90% Relative Humidity)

The optical film, bonded to a glass plate (Eagle XG, Corning) by SK-2057 (Soken Chemical & Engineering Co. Ltd), was allowed to stand at 25° C./60% relative humidity for 6 hours, and the thicknesswise retardation was measured using AxoScan (from Axometrics, Inc.). The value was referred to as Rth(Fresh). Meanwhile, the optical film, bonded to a glass plate (Eagle XG, Corning) by SK-2057 (Soken Chemical & Engineering Co. Ltd), was allowed to stand at 60° C./90% relative humidity for 24 hours, and the thicknesswise retardation was measured using AxoScan (from Axometrics, Inc.). The value was referred to as Rth(60° C.90%).

Using the results, (Rth(60° C.90%)−Rth(Fresh))/Rth(Fresh) was determined.
(Dimensional Change Rate)

A film sample of 12 cm long (in the direction of measurement) and 3.5 cm wide, cut from the film so as to align the longitudinal direction to the slow axis of the film, or, a film sample cut from the film so as to align the longitudinal direction to the direction perpendicular thereto, was prepared. The sample was pierced to form pinholes at 10 cm intervals, allowed to be conditioned at 25° C., 60% relative humidity for 2 hours, and then measured regarding the distance between the pinholes using a pin gauge (measured value denoted by L0). Next, the sample was kept under a hot and humid environment at 60° C., 90% relative humidity for 24 hours, and further conditioned at 25° C., 60% relative humidity for 2 hours, and the distance between the pinholes are again measured using the pin gauge (measured value denoted by L'). Using these measured values, the dimensional change rate was calculated according to the equation below.

Dimensional change rate[%]=(L'−L0)/L0}×100

TABLE 2

| | Optical film | Cotton | Cellulose acylate Degree of substitution of acyl group | Mannose content (% by mass) | Distribution of mannose $M_A/M_B$ | Optical performance developer 1 Species | Content (% by mass) |
|---|---|---|---|---|---|---|---|
| Example 1 | 1 | Cotton linter | 2.42 | 0.15 | 1.2 | Sugar 1 | 13 |
| Example 2 | 2 | Cotton linter | 2.42 | 0.15 | 1.2 | Sugar 2 | 13 |
| Example 3 | 3 | Cotton linter | 2.42 | 0.15 | 1.2 | Sugar 1 | 13 |
| Example 4 | 4 | Cotton linter | 2.42 | 0.15 | 1.2 | Ester 1 | 15 |
| Example 5 | 5 | Cotton linter | 2.42 | 0.15 | 1.2 | Ester 2 | 5 |
| Example 6 | 6 | Cotton linter | 2.42 | 0.15 | 1.2 | Sugar 1 | 13 |
| Example 7 | 7 | Cotton linter | 2.42 | 0.15 | 1.2 | Sugar 1 | 13 |
| Example 8 | 8 | Cotton linter | 2.42 | 0.15 | 1.2 | Sugar 1 | 13 |
| Example 9 | 17 | Cotton linter | 2.42 | 0.15 | 1.2 | Sugar 1 | 13 |
| Example 10 | 18 | Cotton linter | 2.42 | 0.15 | 1.2 | Sugar 1 | 13 |

TABLE 2-continued

| | | | | | | | |
|---|---|---|---|---|---|---|---|
| Comparative Example 1 | 9 | Pulp | 2.4 | 0.6 | 1.15 | N1 | 2.5 |
| Comparative Example 2 | 10 | Pulp | 2.4 | 0.6 | 1.15 | Sugar 1 | 13 |
| Comparative Example 3 | 11 | Pulp | 2.43 | 0.4 | 1.12 | Sugar 2 | 15 |
| Comparative Example 4 | 12 | Cotton linter | 2.42 | 0.15 | 1.05 | Sugar 1 | 10 |
| Comparative Example 5 | 13 | Cotton linter | 2.8 | 0.2 | 1.15 | Sugar 1 | 13 |
| Comparative Example 6 | 14 | Cotton linter | 1.5 | | | | |
| Comparative Example 7 | 15 | Cotton linter | 2.42 | 0.15 | 1.2 | Sugar 1 | 13 |
| Comparative Example 8 | 16 | Cotton linter | 2.42 | 0.15 | | Sugar 1 | 13 |

| | Optical performance developer 1 | Optical performance developer 2 | | | Conditions of drying on band | |
|---|---|---|---|---|---|---|
| | Distribution of optical performance developer 1 $C_A/C_B$ | Species | Content (% by mass) | Distribution of optical performance developer 2 $C_A/C_B$ | Temperature of band (° C.) | Temperature of surface of support (° C.) |
| Example 1 | 1.12 | N2 | 2.5 | 1.2 | 50 | 15 |
| Example 2 | 1.12 | N2 | 2.5 | 1.2 | 50 | 15 |
| Example 3 | 1.12 | N3 | 2 | 1.3 | 50 | 15 |
| Example 4 | 1.4 | — | — | — | 50 | 15 |
| Example 5 | 1.7 | N3 | 2 | 1.3 | 50 | 15 |
| Example 6 | 1.12 | N2 | 2.5 | 1.2 | 50 | 15 |
| Example 7 | 1.12 | N2 | 2.5 | 1.2 | 50 | 15 |
| Example 8 | 1.12 | N3 | 2 | 1.3 | 50 | 15 |
| Example 9 | 1.12 | N2 | 2.5 | 1.2 | 50 | 15 |
| Example 10 | 1.12 | N2 | 2.5 | 1.2 | 50 | 15 |
| Comparative Example 1 | 1.05 | N2 | 2.5 | 1.2 | 50 | 15 |
| Comparative Example 2 | 1.12 | N1 | 2.5 | 1.05 | 50 | 15 |
| Comparative Example 3 | 1.12 | N3 | 3 | 1.3 | 50 | 15 |
| Comparative Example 4 | 1.11 | N2 | 3.5 | 1.15 | 50 | 15 |
| Comparative Example 5 | 1.12 | N2 | 2.5 | 1.2 | 50 | 15 |
| Comparative Example 6 | | | | | | |
| Comparative Example 7 | 1.08 | N2 | 2.5 | 1.08 | 50 | 35 |
| Comparative Example 8 | | N2 | 2.5 | | 130 | 20 |

TABLE 3

| | Optical film | Thickness (μm) | $Hv_{15}$ (0°, 90°) ($\times 10^{-3}$ cd/m²) | {Rth(60° C. 90%) − Rth(Fresh)}/Rth | Dimensional change rate in slow axis direction of film (%) | Dimensional change rate in direction perpendicular to slow axis direction of film (%) | Re (550) (nm) | Rth (550) (nm) |
|---|---|---|---|---|---|---|---|---|
| Example 1 | 1 | 30 | 4 | 0.01 | −0.6 | −0.7 | 45 | 122 |
| Example 2 | 2 | 35 | 7 | 0.01 | −0.4 | −0.8 | 45 | 122 |
| Example 3 | 3 | 35 | 7 | 0.07 | −0.65 | −0.75 | 45 | 122 |
| Example 4 | 4 | 38 | 8 | 0.06 | −0.8 | −0.9 | 45 | 122 |
| Example 5 | 5 | 25 | 3 | 0.08 | −0.3 | −0.55 | 45 | 122 |
| Example 6 | 6 | 38 | 6 | 0.01 | −0.1 | −0.2 | 43 | 115 |
| Example 7 | 7 | 25 | 4 | 0.01 | −1.2 | −1.3 | 46 | 126 |
| Example 8 | 8 | 35 | 7 | 0.07 | −0.2 | −0.3 | 46 | 128 |
| Example 9 | 17 | 30 | 4.5 | 0.01 | −0.7 | −0.75 | 45 | 120 |
| Example 10 | 18 | 30 | 5 | 0.01 | −0.8 | −0.9 | 45 | 121 |
| Comparative Example 1 | 9 | 27 | 16 | 0.06 | −0.65 | −0.75 | 55 | 135 |
| Comparative Example 2 | 10 | 30 | 17 | 0.04 | −0.45 | −0.55 | 50 | 125 |

TABLE 3-continued

| | Optical film | Thickness (μm) | $Hv_{15}$ (0°, 90°) ($\times 10^{-3} cd/m^2$) | {Rth(60° C. 90%) − Rth(Fresh)}/Rth | Dimensional change rate in slow axis direction of film (%) | Dimensional change rate in direction perpendicular to slow axis direction of film (%) | Re (550) (nm) | Rth (550) (nm) |
|---|---|---|---|---|---|---|---|---|
| Comparative Example 3 | 11 | 30 | 15 | 0.03 | −0.55 | −0.8 | 47 | 127 |
| Comparative Example 4 | 12 | 45 | 14 | 0.02 | −0.4 | −0.6 | 55 | 130 |
| Comparative Example 5 | 13 | 80 | 20 | 0.01 | −0.2 | −0.4 | 25 | 70 |
| Comparative Example 6 | 14 | | | | Handling impossible | | | |
| Comparative Example 7 | 15 | 35 | 14 | 0.01 | −0.5 | −0.8 | 44 | 117 |
| Comparative Example 8 | 16 | | | | Foamed | | | |

In Table, sugar 1, sugar 2, ester 1, ester 2, and N1 to N3 are compounds shown below.

Compound N2 was synthesized as described below, according to a method of synthesis described in *Bioorganic & Medicinal Chemistry*, 2010, 18, 6184-6196. Under a $N_2$ atmosphere, a mixture of benzoic acid hydrazide (40 kg, 293 mol, 1 equivalent) and benzonitrile (396 kg, 3840 mol, 13.1 equivalent) was stirred at refluxing temperature for 14 hours. The mixture was cooled down to room temperature, resultant precipitate was collected by filtration, and then washed with 2-propanol. By re-crystallization from 2-propanol, Compound 6-a (37.7 kg, 58%) was obtained as a white solid. 1H NMR (400 MHz, DMSO-d6): δ 7.41-7.59 (m, 6H), 8.07-8.10 (m, 2H), 8.12 (1s, 1H); 13C NMR (100 MHz, DMSO-d6): δ 125.9, 126.1, 128.7, 129.1, 130.2, 131.3; HRMS (EI) [M]+ Calcd for C14H11N3: 221.0953. Found: 221.0948.

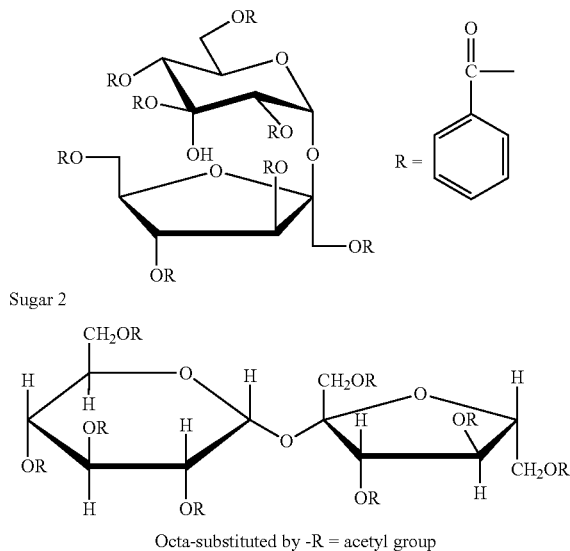

Sugar 1: Degree of substitution = 5.5

Sugar 2

Octa-substituted by -R = acetyl group

TABLE 4

| Polycondensed ester | | | | | | |
|---|---|---|---|---|---|---|
| Dicarboxylic acid unit | | Diol unit | | | | |
| TPA | AA | EG | PG | | Terminal | Molecular weight |
| Ester-1 | 50 | 50 | 50 | 50 | —OAc | 1500 |
| Ester-2 | 70 | 30 | 50 | 50 | —OAc | 1800 |

Molecular weight in Table represents weight-average molecular weight.
Numerals in Table are given in molar ratio.
Ac represents acetyl group.

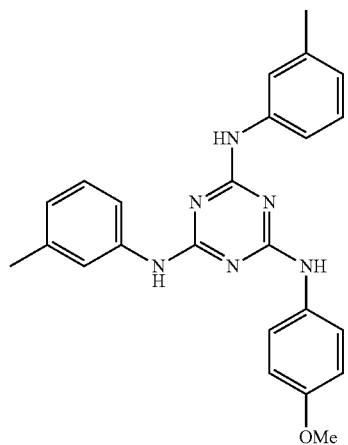

N1

(Me represents methyl group.)

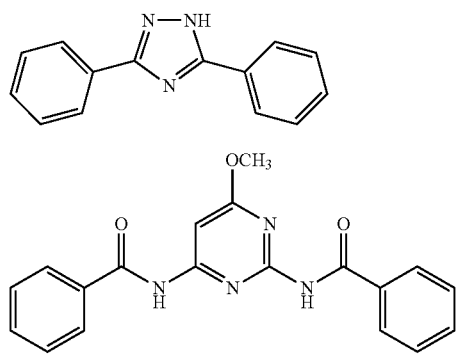

N2

N3

<Manufacture of Polarizing Plate>

The surfaces of the individual optical films manufactured in Examples and Comparative Examples were saponified with alkali. The optical films were immersed in a 1.5 N (1.5 mol/L) aqueous sodium hydroxide solution at 55° C. for 2 minutes, washed in a water washing bath at room temperature, and neutralized with a 0.1 N (0.05 mol/L) sulfuric acid at 30° C. The optical films were again washed in the water washing bath at room temperature, and further dried by hot air at 100° C.

Next, a rolled polyvinyl alcohol film was continuously stretched five-fold in an aqueous iodine solution, and then dried to obtain a polarizer. Each of the alkali-saponified optical films of Examples and Comparative Examples, and a protective film (TD60UL, from Fujifilm Corporation) were prepared, and then bonded while placing the polarizer in between and while directing the saponified surface to the polarizer, using a 3% aqueous polyvinyl alcohol (PVA-117H, from Kuraray Co., Ltd.) solution as an adhesive, to thereby obtain each polarizing plate configured by each of the optical films of Examples and Comparative Examples, the polarizer, and the protective film bonded in this order. In this process, the optical film of this invention and the protective film were bonded so as to align the MD direction (film feeding direction) of them in parallel to the absorption axis of the polarizer.

By changing the thickness of polarizer and the type of the optical film, polarizing plates 101-104 were prepared.

An acrylic adherent layer of 15 μm thickness was provided on a surface at the side of the optical film of Examples and Comparative Examples, and a separate film of 38 μm thickness was bonded to its outer side. An acrylic adherent layer and a protective film of 60 μm thickness which is composed of polyethylene terephthalate were bonded to the surface of the polarizing plate at the side of the protective film (TD60US) to prepare a polarizing plate for evaluation.

(Method for Evaluation of Wavy Curl)

The aforementioned obtained polarizing plates were punched into rectangle having a long side of 1150 mm and a short side of 645 mm in a state that the absorption axis of the polarizing plate was parallel to the short side. The punched polarizing plate was left stand on a flat under a condition of 23° C. and 55% RH for 24 hours in a state where the separate film was located beneath. Then, the site which floated from the flat on the four sides of the polarizing plate was identified as a wave. For each wave, the maximum height of the float from the flat was measured as a wave height by using a straight measure silver (Shinwa Rules Co., Ltd.). The height of each wave of each side of the polarizing plate was measured while the polarized film was left stand in a state where the separate film was located beneath or in a state where the separate film was located above.

The site with a wave height of 1 mm or more was counted as one wave. The number of the wave and the height of the wave were measured for each side of the polarizing plate. The measurement results are shown in Table below. The maximum value among the number of the wave of each side is referred to as "wave number" and the maximum height of the wave among all measurement results is referred to as "wave height". A sample having a wave height of 3 mm or less and a wave number of 3 or less can be practically used without a problem.

The polarizing plate with a biaxially stretched optical film (optical film 18) showed lower wave height and less wave number and were more excellent, as compared with an uniaxially stretched optical film (optical film 17). The polarizing plate with a polarizer having a thickness of 10 μm showed more excellent wave height and wave number, as compared with the polarizing plate with a polarizer having a thickness of 25 μm.

TABLE 5

| | | | | Wavy curl | |
|---|---|---|---|---|---|
| Polarizing Plate No. | Optical Film No. | Thickness of polarizer (μm) | Protective film | Wave height (mm) | Wave number |
| 101 | 17 | 25 | TD60UL | 3 | 3 |
| 102 | 18 | 25 | TD60UL | 2 | 2 |
| 103 | 17 | 10 | TD60UL | 1 | 2 |
| 104 | 18 | 10 | TD60UL | 0.5 | 0 |

<Manufacture of Liquid Crystal Display Device>

Polarizing plates and retardation plates were peeled off from the front and back sides of a VA-mode liquid crystal TV set (LC-46LV3, from SHARP Corporation), and the resultant were used as a liquid crystal cell. A protective film, a polarizer, the optical film of this invention, the liquid crystal cell (VA liquid crystal cell), the optical film of this invention, a polarizer and a protective film were bonded in this order using a pressure-sensitive adhesive, to thereby manufacture each of liquid crystal display devices of Examples and Comparative Examples. The upper and lower polarizing plate in this process were bonded so as to cross the absorption axes perpendicularly. The thickness of the polarizer was 15 µm.

The degree of depolarization of the liquid crystal cells was measured right in front according to a method described in "Y. Utsumi et al., "Reduced Light Scattering Intensity from Liquid Crystal for Higher Contrast Ratio in IPS-Pro LCDs", IDW '07, p. 1749, 2007. 2", and all liquid crystal cells showed a value of 0.01.

<Evaluation>
(Evaluation of Front Contrast)

The thus manufactured liquid crystal display devices were measured regarding luminance and chromaticity in black display and white display in a darkroom, using a measurement instrument (EZ-Contrast XL88, from ELDIM), and evaluated according to the criteria below:

1: ≥8000
2: 8000>, ≥5000
3: 5000>

(Hue Changes in Oblique View, after Allowed to Stand at 60° C./90% Relative Humidity for 48 Hours, and Illuminated for 24 Consecutive Hours)

Hue (u',v') of the liquid crystal display device, when viewed at a polar angle 60° and an azimuth of 45°, was measured using a measuring instrument (EZ-Contrast XL88, from ELDIM), and thereby luminance and chromaticity in the black display and white display were measured and evaluated in a darkroom.

Meanwhile, the liquid crystal display device was allowed to stand in a 60° C./90% relative humidity environment for 48 hours, the liquid crystal display device is then taken out, and then illuminated in a 25° C./60% relative humidity environment for 24 consecutive hours. Thereafter, again using the measuring instrument (EZ-Contrast XL88, from ELDIM), hue (u',v') when viewed at a polar angle of 60° and an azimuth of 45°, was measured, and thereby luminance and chromaticity in the black display and white display were evaluated in a darkroom.

The hue (u',v') measured in an early stage of manufacture at a polar angle of 60° and an azimuth of 45° was compared with the hue measured after allowed to stand at 60° C./90% relative humidity environment for 48 hours and after illuminated for 24 consecutive hours at a polar angle of 60° and an azimuth of 45°, to calculate $\Delta u'v'$ according to the equation below, and evaluated according to the criteria below. Values of 1 to 3 indicate practically acceptable levels.

$$\Delta u'v' = \sqrt{(u'_{after} - u'_{before})^2 + (v'_{after} - v'_{before})^2}$$

where, u'after and v'after respectively represent u' and v' measured at a polar angle of 60° and an azimuth of 45°, after allowed to stand at 60° C./90% for 48 hours, and after illuminated for 24 consecutive hours; and u'before and v'before respectively represent u' and v' measured in an early stage of manufacture at a polar angle of 60° and an azimuth of 45°.

1: ≤0.02
2: >0.02, ≤0.05
3: >0.05, ≤0.08
4: >0.08, ≤0.10
5: >0.10

(Nonuniformity in Front View after Allowed to Stand at 40° C./90% Relative Humidity for 96 Hours, and Illuminated for 24 Consecutive Hours)

The thus manufactured liquid crystal display device was allowed to stand in a 40° C./90% relative humidity environment for 96 hours, taken out, and illuminated in a 25° C./60% environment for 24 consecutive hours. The liquid crystal display device was then observed from the front in a darkroom environment, and evaluated according to the criteria below. Values of 1 to 3 indicate practically acceptable levels.

1: Nonuniformity almost not recognizable (less than 5% of the display area)
2: Nonuniformity slightly recognizable (exceeding 5% and not larger than 10% of display area)
3: Nonuniformity recognizable (exceeding 10% and not larger than 15% of display area)
4: Nonuniformity strongly recognizable (exceeding 15% and not larger than 20% or display area)
5: Nonuniformity strongly recognizable (exceeding 20% of display area)

(Initial Leakage of Light in Oblique View)

The liquid crystal display device in the state of black display was measured in a darkroom regarding the black luminance at a polar angle of 60° and an azimuth of 45°, using a measuring instrument (EZ-Contrast XL88, from ELDIM).

1: ≤0.5 cd/m²
2: >0.5 cd/m², ≤1.0 cd/m²
3: >1.0 d/m², ≤1.5 cd/m²
4: >1.5 cd/m², ≤2.0 cd/m²
5: >2.0 cd/m²

TABLE 6

| | Configuration | | Liquid crystal cell | | | Evaluation of liquid crystal display device | | |
|---|---|---|---|---|---|---|---|---|
| | Liquid crystal display device | Optical film | Liquid crystal cell | Degree of Depolarization | Front contrast | Hue changes in oblique view, after allowed to stand at 60° C./90% relative humidity for 48 hours, and illuminated for 24 consecutive hours | Nonuniformity in front view after allowed to stand at 40° C./90% relative humidity for 96 hours, and illuminated for 24 consecutive hours | Initial leakage of light in oblique view |
| Example 101 | Liquid crystal display device 1 | Example 1 | LC1 | 0.01 | 9500  1 | 1 | 1 | 1 |
| Example 102 | Liquid crystal display device 2 | Example 2 | LC1 | 0.01 | 8500  1 | 1 | 2 | 1 |
| Example 103 | Liquid crystal display device 3 | Example 3 | LC1 | 0.01 | 8200  1 | 2 | 1 | 1 |
| Example 104 | Liquid crystal display device 4 | Example 4 | LC1 | 0.01 | 7500  2 | 2 | 1 | 1 |

TABLE 6-continued

| | Configuration | | Liquid crystal cell | | | Evaluation of liquid crystal display device | | | |
|---|---|---|---|---|---|---|---|---|---|
| | | | | | | | Hue changes in oblique view, after allowed to stand at 60° C./90% relative humidity for 48 hours, and illuminated for 24 consecutive hours | Nonuniformity in front view after allowed to stand at 40° C./90% relative humidity for 96 hours, and illuminated for 24 consecutive hours | Initial leakage of light in oblique view |
| | Liquid crystal display device | Optical film | Liquid crystal cell | Degree of Depolarization | Front contrast | | | | |
| Example 105 | Liquid crystal display device 5 | Example 5 | LC1 | 0.01 | 9600 | 1 | 2 | 1 | 1 |
| Example 106 | Liquid crystal display device 6 | Example 6 | LC1 | 0.01 | 8400 | 1 | 2 | 3 | 2 |
| Example 107 | Liquid crystal display device 7 | Example 7 | LC1 | 0.01 | 9000 | 1 | 2 | 3 | 1 |
| Example 108 | Liquid crystal display device 8 | Example 8 | LC1 | 0.01 | 9200 | 1 | 3 | 3 | 1 |
| Example 109 | Liquid crystal display device 15 | Example 9 | LC1 | 0.01 | 9500 | 1 | 2 | 3 | 1 |
| Example 110 | Liquid crystal display device 16 | Example 10 | LC1 | 0.01 | 9400 | 1 | 3 | 3 | 1 |
| Comparative Example 101 | Liquid crystal display device 9 | Comparative Example 1 | LC1 | 0.01 | 4500 | 3 | 2 | 2 | 1 |
| Comparative Example 102 | Liquid crystal display device 10 | Comparative Example 2 | LC1 | 0.01 | 4600 | 3 | 1 | 2 | 1 |
| Comparative Example 103 | Liquid crystal display device 11 | Comparative Example 3 | LC1 | 0.01 | 4300 | 3 | 1 | 1 | 1 |
| Comparative Example 104 | Liquid crystal display device 12 | Comparative Example 4 | LC1 | 0.01 | 4800 | 3 | 1 | 2 | 1 |
| Comparative Example 105 | Liquid crystal display device 13 | Comparative Example 5 | LC1 | 0.01 | 4200 | 3 | 1 | 3 | 3 |
| Comparative Example 106 | Liquid crystal display device 14 | Comparative Example 7 | LC1 | 0.01 | 4300 | 3 | 1 | 2 | 2 |

From Table above, the liquid crystal display devices using the optical films of this invention were found to be improved in the front contrast, and further in leakage of light in oblique view and hygrothermal durability.

REFERENCE SIGNS LIST 1 when film is held between a pair of polarizing plates disposed so as to cross absorption axes perpendicularly, and light is made incident in normal line direction
2 when light obliquely incident on film (at angle different from angle of absorption axes of upper and lower polarizing plates) is scattered in front direction, due to scattering factor within film
3 when scattering factor resides in film
10, 11 polarizing plate
12 film
13 diffusion light source
14 in-plane distribution
101 polarizing plate
102 film
103 polarizing plate

The invention claimed is:
1. An optical film which comprises cellulose acylate whose degree of substitution of acyl group is from 2.0 to 2.6 and at least one optical performance developer, wherein the cellulose acylate has a mannose content of 0.2% by mass or less, and the optical film has a thickness of 40 μm or thinner and satisfies Formula I and Formula II below:

$$M_A \geq M_B \times 1.1 \qquad \text{Formula I}$$

$$C_A \geq C_B \times 1.1 \qquad \text{Formula II}$$

in the formulae, A denotes the depthwise region ranging from one surface up to 2 μm depth of the optical film, and B denotes the depthwise region ranging from the other surface up to 2 μm depth of the optical film, and $M_A$ represents the mannose content in the region A, $M_B$ represents the mannose content in the region B; $C_A$ represents the content of the optical performance developer in the region A, and $C_B$ represents the content of optical performance developer in the region B; and $M_A$, $M_B$, $C_A$ and $C_B$ are given in % by mass, and wherein the optical film further satisfies Formula III below:

$$Hv_{15}(0°,90°) \leq 10 \times 10^{-3} \qquad \text{Formula III}$$

in the formula, $Hv_{15}(0°,90°)=(Hv_{15}(0°)+Hv_{15}(90°))/2$, wherein $Hv_{15}(0°)$ and $Hv_{15}(90°)$ are measured with an arrangement of "polarizing plate/optical film/polarizing plate" with the absorption axes orthogonally arranged, and azimuth angle of 0° is defined in the direction of slow axis of the optical film, and $Hv_{15}(0°)$ represents luminance of light transmitting through the polarizing plates, when light is incident in the direction given by polar angle of 15° and azimuth angle of 0°, and $Hv_{15}(90°)$ represents luminance of light transmitting through the polarizing plates when light is incident in the direction given by polar angle of 15° and azimuth angle of 90°, and Hv$_{15}$(0°) and Hv$_{15}$(90°) are given in cd/m$^2$.

2. The optical film of claim 1, which further satisfies Formula IV below:

(Rth(60° C.90%)−Rth(Fresh))/Rth(Fresh)≤0.05   Formula IV in the formula, Rth(60° C.90%) represents thicknesswise retardation of the optical film bonded to a glass plate, measured at a wavelength of 550 nm after the optical film allowed to stand in a 60° C./90% relative humidity environment for 24 hours and further in a 25° C./60% relative humidity environment for 6 hours; and Rth (Fresh) represents thicknesswise retardation of the optical film bonded to a glass plate, measured at a wavelength of 550 nm after the optical film allowed to stand in a 25° C./60% relative humidity environment for 6 hours.

3. The optical film of claim 1, which further satisfies Formula IV below:

(Rth(60° C.90%)−Rth(Fresh))/Rth(Fresh)≤0.05   Formula IV in the formula, Rth(60° C.90%) represents thicknesswise retardation of the optical film bonded to a glass plate, measured at a wavelength of 550 nm after the optical film allowed to stand in a 60° C./90% relative humidity environment for 24 hours and further in a 25° C./60% relative humidity environment for 6 hours; and Rth (Fresh) represents thicknesswise retardation of the optical film bonded to a glass plate, measured at a wavelength of 550 nm after the optical film allowed to stand in a 25° C./60% relative humidity environment for 6 hours; and Rth represents thicknesswise retardation of the optical film measured at a wavelength of 550 nm.

4. The optical film of claim 1, wherein dimensional change rate of the optical film in the direction of slow axis and/or in the perpendicular direction satisfies Formula V below:

−1.0%≤{(L'−L0)/L0}×100≤−0.5%   Formula V in the formula, L0 represents length of the optical film after conditioned in a 25° C./60% relative humidity atmosphere for 2 hours; and L' represents length of the optical film after allowed to stand at 60° C./90% relative humidity environment for 24 hours, and further conditioned in a 25° C./60% relative humidity atmosphere for 2 hours.

5. The optical film of claim 2, wherein dimensional change rate of the optical film in the direction of slow axis and/or in the perpendicular direction satisfies Formula V below:

−1.0%≤{(L'−L0)/L0}×100≤−0.5%   Formula V in the formula, L0 represents length of the optical film after conditioned in a 25° C./60% relative humidity atmosphere for 2 hours; and L' represents length of the optical film after allowed to stand at 60° C./90% relative humidity environment for 24 hours, and further conditioned in a 25° C./60% relative humidity atmosphere for 2 hours.

6. The optical film of claim 1 which satisfies Formula VI and Formula VII below:

30 nm≤Re(550)≤80 nm   Formula VI 90 nm≤Rth(550)≤300 nm   Formula VII where, Re(550) represents in-plane retardation of the optical film measured at a wavelength of 550 nm, and Rth(550) represents thicknesswise retardation of the optical film measured at a wavelength of 550 nm.

7. The optical film of claim 4, wherein dimensional change rate of the optical film in the direction of slow axis and/or in the perpendicular direction satisfies Formula V below:

−1.0%≤{(L'−L0)/L0}×100≤−0.5%   Formula V in the formula, L0 represents length of the optical film after conditioned in a 25° C./60% relative humidity atmosphere for 2 hours; and L' represents length of the optical film after allowed to stand at 60° C./90% relative humidity for 24 hours, and further conditioned in a 25° C./60% relative humidity atmosphere for 2 hours.

8. A polarizing plate which comprises the optical film described in claim 1, and a polarizer.

9. A polarizing plate which comprises the optical film described in claim 2, and a polarizer.

10. A polarizing plate which comprises the optical film described in claim 4, and a polarizer.

11. A polarizing plate which comprises the optical film described in claim 6, and a polarizer.

12. A liquid crystal display device which comprises the optical film described in claim 1.

13. A liquid crystal display device which comprises the polarizing plate described in claim 8.

14. The liquid crystal display device of claim 12, wherein the liquid crystal display device comprises a liquid crystal cell held between a pair of polarizing plates, each polarizing plate comprises an optical film, a polarizer, and a protective film arranged in this order from the side of the liquid crystal cell, the liquid crystal cell has a degree of depolarization of 0.02% or less when observed from the front, and at least one of the optical films is the optical film described in claim 1.

15. The liquid crystal display device of claim 13, wherein the liquid crystal display device comprises a liquid crystal cell held between a pair of polarizing plates, each polarizing plate comprises an optical film, a polarizer, and a protective film which are arranged in this order from the side of the liquid crystal cell, the liquid crystal cell has a degree of depolarization of 0.02% or less when observed from the front, and at least one of the optical films is the optical film described in claim 1.

16. An optical film which comprises cellulose acylate whose degree of substitution of acyl group is from 2.0 to 2.6 and at least one optical performance developer,
wherein the cellulose acylate has a mannose content of 0.2% by mass or less, and the optical film has a thickness of 40 μm or thinner and satisfies Formula I and Formula II below:

$M_A \geq M_B \times 1.1$   Formula I $C_A \geq C_B \times 1.1$   Formula II in the formulae, A denotes the depthwise region ranging from one surface up to 2 μm depth of the optical film, and B denotes the depthwise region ranging from the other surface up to 2 μm depth of the optical film, and $M_A$ represents the mannose content in the region A, $M_B$ represents the mannose content in the region B; $C_A$ represents the content of the optical performance developer in the region A, and $C_B$ represents the content of optical performance developer in the region B; and $M_A$, $M_B$, $C_A$ and $C_B$ are given in % by mass.

* * * * *